US008775245B2

(12) United States Patent
Christie et al.

(10) Patent No.: US 8,775,245 B2
(45) Date of Patent: Jul. 8, 2014

(54) SECURE COUPON DISTRIBUTION

(75) Inventors: William Christie, Fairfield, CT (US);
Jeffery Beliveau, Pauling, NY (US);
Henri Lellouche, Fairfield, CT (US)

(73) Assignee: News America Marketing Properties, LLC, New York, NY (US)

( * ) Notice: Subject to any disclaimer, the term of this patent is extended or adjusted under 35 U.S.C. 154(b) by 129 days.

(21) Appl. No.: 12/704,376

(22) Filed: Feb. 11, 2010

(65) Prior Publication Data

US 2011/0196731 A1 Aug. 11, 2011

(51) Int. Cl.
*G06Q 30/00* (2012.01)
*H04L 9/32* (2006.01)
*G06Q 30/02* (2012.01)
*G06F 21/33* (2013.01)
*H04L 29/06* (2006.01)

(52) U.S. Cl.
CPC ............ *G06F 21/335* (2013.01); *H04L 63/083* (2013.01); *H04L 2209/56* (2013.01); *H04L 9/3226* (2013.01); *G06Q 30/02* (2013.01); *G06Q 30/0225* (2013.01); *G06F 2221/2119* (2013.01); *H04L 9/3213* (2013.01); *G06F 2221/2115* (2013.01); *H04L 9/3263* (2013.01); *H04L 63/102* (2013.01)
USPC ...................................................... 705/14.26

(58) Field of Classification Search
USPC ...................................................... 705/14.26
See application file for complete search history.

(56) References Cited

U.S. PATENT DOCUMENTS

| | | |
|---|---|---|
| 2,995,727 A | 8/1961 | Quade |
| 3,212,062 A | 10/1965 | Goldman et al. |
| 3,316,536 A | 4/1967 | Andrews et al. |
| 3,318,428 A | 5/1967 | Klein |
| 3,426,326 A | 2/1969 | Goldstein |
| 3,465,289 A | 9/1969 | Klein |
| 3,505,646 A | 4/1970 | Affel, Jr. et al. |
| 3,526,308 A | 9/1970 | Thomas |
| 3,606,688 A | 9/1971 | Zawels et al. |
| 3,737,631 A | 6/1973 | Harris |

(Continued)

FOREIGN PATENT DOCUMENTS

| | | |
|---|---|---|
| CA | 2240432 | 7/1997 |
| CA | 2269624 | 5/1998 |

(Continued)

OTHER PUBLICATIONS

U.S. Appl. No. 09/073,334, filed May 6, 1998.

(Continued)

*Primary Examiner* — Naresh Vig
(74) *Attorney, Agent, or Firm* — Foley & Lardner LLP

(57) ABSTRACT

Systems and method are provided for ensuring secure and validated coupon generation and distribution, and the prevention of fraudulent coupon printing. A Uniform Resource Locator (URL) is provided to a consumer, where the URL points to a dynamic coupon webpage presentable to the consumer, and where the URL includes a link identifier indicative of a coupon contained on the dynamic coupon webpage to be printed. The URL may include a member identifier (MID) that uniquely identifies the consumer and provides security regarding the printing of the coupon by limiting the number of prints that the consumer can make of the coupon. Furthermore, a token may be utilized in conjunction with the MID for additional security regarding the printing of the coupon by preventing the printing of the coupon if the token is invalid or expired.

24 Claims, 12 Drawing Sheets

(56) References Cited

U.S. PATENT DOCUMENTS

| | | |
|---|---|---|
| 3,770,941 A | 11/1973 | Gechele et al. |
| 3,771,132 A | 11/1973 | Biewer |
| 3,777,410 A | 12/1973 | Robinson |
| 3,848,193 A | 11/1974 | Martin et al. |
| 3,889,062 A | 6/1975 | Epstein |
| 3,899,775 A | 8/1975 | Larsen |
| 3,959,624 A | 5/1976 | Kaslow |
| 3,987,398 A | 10/1976 | Fung |
| 4,002,886 A | 1/1977 | Sundelin |
| 4,004,354 A | 1/1977 | Yamauchi |
| 4,012,132 A | 3/1977 | Lazarus |
| 4,014,004 A | 3/1977 | Fuller |
| 4,044,380 A | 8/1977 | Justice et al. |
| 4,071,697 A | 1/1978 | Bushnell et al. |
| 4,071,740 A | 1/1978 | Gogulski |
| 4,141,078 A | 2/1979 | Bridges, Jr. et al. |
| 4,166,540 A | 9/1979 | Marshall |
| 4,170,782 A | 10/1979 | Miller |
| 4,186,413 A | 1/1980 | Mortimer |
| 4,186,438 A | 1/1980 | Benson et al. |
| 4,208,652 A | 6/1980 | Marshall |
| 4,210,961 A | 7/1980 | Whitlow et al. |
| 4,224,644 A | 9/1980 | Lewis et al. |
| 4,245,468 A | 1/1981 | Fondacci |
| 4,247,759 A | 1/1981 | Yuris et al. |
| RE30,579 E | 4/1981 | Goldman et al. |
| RE30,580 E | 4/1981 | Goldman et al. |
| 4,264,924 A | 4/1981 | Freeman |
| 4,268,744 A | 5/1981 | McGeary |
| 4,271,351 A | 6/1981 | Bloodworth |
| 4,281,762 A | 8/1981 | Hattemer |
| 4,287,592 A | 9/1981 | Paulish et al. |
| 4,288,809 A | 9/1981 | Yabe |
| 4,290,688 A | 9/1981 | Call |
| 4,305,101 A | 12/1981 | Yarbrough et al. |
| 4,307,446 A | 12/1981 | Barton et al. |
| 4,331,973 A | 5/1982 | Eskin et al. |
| 4,331,974 A | 5/1982 | Cogswell et al. |
| 4,338,644 A | 7/1982 | Staar |
| 4,347,498 A | 8/1982 | Lee et al. |
| 4,355,372 A | 10/1982 | Johnson et al. |
| 4,359,631 A | 11/1982 | Lockwood et al. |
| 4,373,133 A | 2/1983 | Clyne et al. |
| 4,381,522 A | 4/1983 | Lambert |
| 4,396,985 A | 8/1983 | Ohara |
| 4,404,589 A | 9/1983 | Wright, Jr. |
| 4,405,946 A | 9/1983 | Knight |
| 4,412,631 A | 11/1983 | Haker |
| 4,419,573 A | 12/1983 | von Geldern |
| 4,429,385 A | 1/1984 | Cichelli et al. |
| 4,449,186 A | 5/1984 | Kelly et al. |
| 4,451,701 A | 5/1984 | Bendig |
| 4,458,320 A | 7/1984 | Sutton |
| 4,476,488 A | 10/1984 | Merrell |
| 4,484,302 A | 11/1984 | Cason et al. |
| 4,484,328 A | 11/1984 | Schlafly |
| 4,488,179 A | 12/1984 | Kruger et al. |
| 4,500,880 A | 2/1985 | Gomersall et al. |
| 4,529,870 A | 7/1985 | Chaum |
| 4,532,554 A | 7/1985 | Skala |
| 4,536,791 A | 8/1985 | Campbell et al. |
| 4,546,382 A | 10/1985 | McKenna et al. |
| 4,554,446 A | 11/1985 | Murphy et al. |
| 4,567,359 A | 1/1986 | Lockwood |
| 4,573,072 A | 2/1986 | Freeman |
| 4,575,579 A | 3/1986 | Simon et al. |
| RE32,115 E | 4/1986 | Lockwood et al. |
| 4,588,881 A | 5/1986 | Pejas et al. |
| 4,592,546 A | 6/1986 | Fascenda et al. |
| 4,593,904 A | 6/1986 | Graves |
| 4,597,046 A | 6/1986 | Musmanno et al. |
| 4,602,279 A | 7/1986 | Freeman |
| 4,603,232 A | 7/1986 | Kurland et al. |
| 4,608,601 A | 8/1986 | Shreck et al. |
| 4,625,275 A | 11/1986 | Smith |
| 4,626,844 A | 12/1986 | Mann et al. |
| 4,630,108 A | 12/1986 | Gomersall |
| 4,635,132 A | 1/1987 | Nakamura |
| 4,636,950 A | 1/1987 | Caswell et al. |
| 4,641,205 A | 2/1987 | Beyers, Jr. |
| 4,642,767 A | 2/1987 | Lerner |
| 4,658,290 A | 4/1987 | McKenna et al. |
| 4,659,073 A | 4/1987 | Leonard |
| 4,669,730 A | 6/1987 | Small |
| 4,670,853 A | 6/1987 | Stepien |
| 4,672,377 A | 6/1987 | Murphy et al. |
| 4,673,802 A | 6/1987 | Ohmae et al. |
| 4,674,041 A | 6/1987 | Lemon et al. |
| 4,677,466 A | 6/1987 | Lert, Jr. et al. |
| 4,691,351 A | 9/1987 | Hayashi et al. |
| 4,691,354 A | 9/1987 | Palminteri |
| 4,699,532 A | 10/1987 | Smith |
| 4,701,794 A | 10/1987 | Froling et al. |
| 4,703,423 A | 10/1987 | Bado et al. |
| 4,706,080 A | 11/1987 | Sincoskie |
| 4,706,121 A | 11/1987 | Young |
| 4,713,761 A | 12/1987 | Sharpe et al. |
| 4,723,212 A | 2/1988 | Mindrum et al. |
| 4,724,307 A | 2/1988 | Dutton et al. |
| 4,733,301 A | 3/1988 | Wright, Jr. |
| 4,734,858 A | 3/1988 | Schlafly |
| 4,738,441 A | 4/1988 | Leonard |
| 4,745,468 A | 5/1988 | Von Kohorn |
| 4,747,050 A | 5/1988 | Brachtl et al. |
| 4,748,684 A | 5/1988 | Wright, Jr. |
| 4,750,151 A | 6/1988 | Baus |
| 4,751,578 A | 6/1988 | Reiter et al. |
| 4,751,669 A | 6/1988 | Sturgis et al. |
| 4,752,675 A | 6/1988 | Zetmeir |
| 4,752,877 A | 6/1988 | Roberts et al. |
| 4,759,063 A | 7/1988 | Chaum |
| 4,764,666 A | 8/1988 | Bergeron |
| 4,768,110 A | 8/1988 | Dunlap et al. |
| 4,774,663 A | 9/1988 | Musmanno et al. |
| 4,775,935 A | 10/1988 | Yourick |
| 4,787,037 A | 11/1988 | Ootsuka |
| 4,789,235 A | 12/1988 | Borah et al. |
| 4,791,281 A | 12/1988 | Johnsen et al. |
| 4,792,018 A | 12/1988 | Humble et al. |
| 4,794,530 A | 12/1988 | Yukiura et al. |
| 4,799,156 A | 1/1989 | Shavit et al. |
| 4,805,134 A | 2/1989 | Calo et al. |
| 4,807,031 A | 2/1989 | Broughton et al. |
| 4,812,986 A | 3/1989 | Smith |
| 4,815,030 A | 3/1989 | Cross et al. |
| 4,815,741 A | 3/1989 | Small |
| 4,816,904 A | 3/1989 | McKenna et al. |
| 4,821,101 A | 4/1989 | Short |
| 4,821,102 A | 4/1989 | Ichikawa et al. |
| 4,823,122 A | 4/1989 | Mann et al. |
| 4,825,045 A | 4/1989 | Humble |
| 4,829,569 A | 5/1989 | Seth-Smith et al. |
| 4,833,308 A | 5/1989 | Humble |
| 4,843,546 A | 6/1989 | Yoshida et al. |
| 4,847,690 A | 7/1989 | Perkins |
| 4,850,007 A | 7/1989 | Marino et al. |
| 4,853,882 A | 8/1989 | Marshall |
| 4,855,908 A | 8/1989 | Shimoda et al. |
| 4,858,000 A | 8/1989 | Lu |
| 4,862,350 A | 8/1989 | Orr et al. |
| 4,866,700 A | 9/1989 | Berry et al. |
| 4,868,866 A | 9/1989 | Williams, Jr. |
| 4,870,596 A | 9/1989 | Smith |
| 4,872,113 A | 10/1989 | Dinerstein |
| 4,873,662 A | 10/1989 | Sargent |
| 4,876,592 A | 10/1989 | Von Kohorn |
| 4,882,675 A | 11/1989 | Nichtberger et al. |
| 4,882,724 A | 11/1989 | Vela et al. |
| 4,887,208 A | 12/1989 | Schneider et al. |
| 4,890,321 A | 12/1989 | Seth-Smith et al. |
| 4,894,784 A | 1/1990 | Smith |
| 4,896,791 A | 1/1990 | Smith |
| 4,908,707 A | 3/1990 | Kinghorn |
| 4,908,713 A | 3/1990 | Levine |

(56) References Cited

U.S. PATENT DOCUMENTS

| | | |
|---|---|---|
| 4,908,761 A | 3/1990 | Tai |
| 4,910,672 A | 3/1990 | Off et al. |
| 4,914,698 A | 4/1990 | Chaum |
| 4,922,522 A | 5/1990 | Scanlon |
| 4,926,255 A | 5/1990 | Von Kohorn |
| 4,926,256 A | 5/1990 | Nanba |
| 4,926,480 A | 5/1990 | Chaum |
| 4,929,819 A | 5/1990 | Collins, Jr. |
| 4,930,011 A | 5/1990 | Kiewit |
| 4,937,742 A | 6/1990 | Marshall |
| 4,937,853 A | 6/1990 | Brule et al. |
| 4,947,430 A | 8/1990 | Chaum |
| 4,949,256 A | 8/1990 | Humble |
| 4,959,686 A | 9/1990 | Spallone et al. |
| 4,959,783 A | 9/1990 | Scott et al. |
| 4,965,437 A | 10/1990 | Nagai |
| 4,972,504 A | 11/1990 | Daniel, Jr. et al. |
| 4,973,952 A | 11/1990 | Malec et al. |
| 4,974,149 A | 11/1990 | Valenti |
| 4,974,170 A | 11/1990 | Bouve et al. |
| 4,975,904 A | 12/1990 | Mann et al. |
| 4,975,905 A | 12/1990 | Mann et al. |
| 4,975,951 A | 12/1990 | Bennett |
| 4,977,455 A | 12/1990 | Young |
| 4,982,337 A | 1/1991 | Burr et al. |
| 4,982,346 A | 1/1991 | Girouard et al. |
| 4,984,156 A | 1/1991 | Mekata |
| 4,987,486 A | 1/1991 | Johnson et al. |
| 4,987,593 A | 1/1991 | Chaum |
| 4,991,011 A | 2/1991 | Johnson et al. |
| 4,992,940 A | 2/1991 | Dworkin |
| 4,994,908 A | 2/1991 | Kuban et al. |
| 4,996,705 A | 2/1991 | Entenmann et al. |
| 5,001,554 A | 3/1991 | Johnson et al. |
| 5,003,384 A | 3/1991 | Durden et al. |
| 5,003,472 A | 3/1991 | Perrill et al. |
| 5,008,853 A | 4/1991 | Bly et al. |
| 5,010,485 A | 4/1991 | Bigari |
| 5,014,125 A | 5/1991 | Pocock et al. |
| 5,014,212 A | 5/1991 | Smith |
| 5,025,139 A | 6/1991 | Halliburton, Jr. |
| 5,025,372 A | 6/1991 | Burton et al. |
| 5,034,807 A | 7/1991 | Von Kohorn |
| 5,039,848 A | 8/1991 | Stoken |
| 5,047,614 A | 9/1991 | Bianco |
| 5,048,833 A | 9/1991 | Lamle |
| 5,053,889 A | 10/1991 | Nakano et al. |
| 5,056,019 A | 10/1991 | Schultz et al. |
| 5,057,915 A | 10/1991 | Von Kohorn |
| 5,058,108 A | 10/1991 | Mann et al. |
| 5,060,185 A | 10/1991 | Naito et al. |
| 5,063,610 A | 11/1991 | Alwadish |
| 5,069,453 A | 12/1991 | Koza et al. |
| 5,070,404 A | 12/1991 | Bullock et al. |
| 5,075,771 A | 12/1991 | Hashimoto |
| 5,077,607 A | 12/1991 | Johnson et al. |
| RE33,808 E | 1/1992 | Wright, Jr. |
| 5,083,272 A | 1/1992 | Walker et al. |
| 5,093,718 A | 3/1992 | Hoarty et al. |
| 5,099,319 A | 3/1992 | Esch et al. |
| 5,099,422 A | 3/1992 | Foresman et al. |
| 5,105,184 A | 4/1992 | Pirani et al. |
| 5,111,196 A | 5/1992 | Hunt |
| 5,111,927 A | 5/1992 | Schulze, Jr. |
| 5,117,355 A | 5/1992 | McCarthy |
| 5,119,294 A | 6/1992 | Tanaka |
| 5,119,295 A | 6/1992 | Kapur |
| 5,124,909 A | 6/1992 | Blakely et al. |
| 5,128,520 A | 7/1992 | Rando et al. |
| 5,128,752 A | 7/1992 | Von Kohorn |
| 5,128,861 A | 7/1992 | Kagami et al. |
| 5,131,039 A | 7/1992 | Chaum |
| 5,133,075 A | 7/1992 | Risch |
| 5,136,501 A | 8/1992 | Silverman et al. |
| 5,144,663 A | 9/1992 | Kudelski et al. |
| 5,151,789 A | 9/1992 | Young |
| 5,155,591 A | 10/1992 | Wachob |
| 5,158,310 A | 10/1992 | Tannehill et al. |
| 5,159,549 A | 10/1992 | Hallman, Jr. et al. |
| 5,162,989 A | 11/1992 | Matsuda |
| 5,168,445 A | 12/1992 | Kawashima et al. |
| 5,173,594 A | 12/1992 | McClure |
| 5,173,851 A | 12/1992 | Off et al. |
| 5,176,224 A | 1/1993 | Spector |
| 5,182,640 A | 1/1993 | Takano |
| 5,185,695 A | 2/1993 | Pruchnicki |
| 5,187,787 A | 2/1993 | Skeen et al. |
| 5,192,854 A | 3/1993 | Counts |
| 5,193,056 A | 3/1993 | Boes |
| 5,198,644 A | 3/1993 | Pfeiffer et al. |
| 5,200,823 A | 4/1993 | Yoneda et al. |
| 5,200,993 A | 4/1993 | Wheeler et al. |
| 5,202,826 A | 4/1993 | McCarthy |
| 5,208,742 A | 5/1993 | Warn |
| 5,214,792 A | 5/1993 | Alwadish |
| 5,220,420 A | 6/1993 | Hoarty et al. |
| 5,220,501 A | 6/1993 | Lawlor et al. |
| 5,220,657 A | 6/1993 | Bly et al. |
| 5,227,874 A | 7/1993 | Von Kohorn |
| 5,230,048 A | 7/1993 | Moy |
| 5,231,493 A | 7/1993 | Apitz |
| 5,231,494 A | 7/1993 | Wachob |
| 5,231,568 A | 7/1993 | Cohen et al. |
| 5,235,509 A | 8/1993 | Mueller et al. |
| 5,237,157 A | 8/1993 | Kaplan |
| 5,237,496 A | 8/1993 | Kagami et al. |
| 5,237,499 A | 8/1993 | Garback |
| 5,237,620 A | 8/1993 | Deaton et al. |
| 5,239,480 A | 8/1993 | Huegel |
| 5,243,174 A | 9/1993 | Veeneman et al. |
| 5,245,533 A | 9/1993 | Marshall |
| 5,245,656 A | 9/1993 | Loeb et al. |
| 5,249,044 A | 9/1993 | Von Kohorn |
| 5,250,789 A | 10/1993 | Johnsen |
| 5,251,324 A | 10/1993 | McMullan, Jr. |
| 5,253,345 A | 10/1993 | Fernandes et al. |
| 5,256,863 A | 10/1993 | Ferguson et al. |
| 5,260,778 A | 11/1993 | Kauffman et al. |
| 5,261,042 A | 11/1993 | Brandt |
| 5,267,171 A | 11/1993 | Suzuki et al. |
| 5,276,736 A | 1/1994 | Chaum |
| 5,278,752 A | 1/1994 | Narita et al. |
| 5,283,639 A | 2/1994 | Esch et al. |
| 5,283,731 A | 2/1994 | Lalonde et al. |
| 5,283,734 A | 2/1994 | Von Kohorn |
| 5,285,272 A | 2/1994 | Bradley et al. |
| 5,285,278 A | 2/1994 | Holman |
| 5,287,181 A | 2/1994 | Holman |
| 5,287,266 A | 2/1994 | Malec et al. |
| 5,287,268 A | 2/1994 | McCarthy |
| 5,295,064 A | 3/1994 | Malec et al. |
| 5,297,026 A | 3/1994 | Hoffman |
| 5,301,028 A | 4/1994 | Banker et al. |
| 5,305,195 A | 4/1994 | Murphy |
| 5,305,196 A | 4/1994 | Deaton et al. |
| 5,305,197 A | 4/1994 | Axler et al. |
| 5,305,199 A | 4/1994 | LoBiondo et al. |
| 5,310,997 A | 5/1994 | Roach et al. |
| 5,315,093 A | 5/1994 | Stewart |
| 5,319,455 A | 6/1994 | Hoarty et al. |
| 5,319,707 A | 6/1994 | Wasilewski et al. |
| 5,331,544 A | 7/1994 | Lu et al. |
| 5,337,155 A | 8/1994 | Cornelis |
| 5,337,253 A | 8/1994 | Berkovsky et al. |
| 5,339,239 A | 8/1994 | Manabe et al. |
| 5,343,239 A | 8/1994 | Lappington et al. |
| 5,343,300 A | 8/1994 | Hennig |
| 5,345,594 A | 9/1994 | Tsuda |
| 5,347,632 A | 9/1994 | Filepp et al. |
| 5,353,218 A | 10/1994 | De Lapa et al. |
| 5,355,480 A | 10/1994 | Smith et al. |
| 5,357,276 A | 10/1994 | Banker et al. |
| 5,361,393 A | 11/1994 | Rossillo |
| 5,367,452 A | 11/1994 | Gallery et al. |

(56) References Cited

U.S. PATENT DOCUMENTS

| | | |
|---|---|---|
| 5,368,129 A | 11/1994 | Von Kohorn |
| 5,373,440 A | 12/1994 | Cohen et al. |
| 5,377,095 A | 12/1994 | Maeda et al. |
| 5,377,354 A | 12/1994 | Scannell et al. |
| 5,380,991 A | 1/1995 | Valencia et al. |
| 5,382,970 A | 1/1995 | Kiefl |
| 5,388,165 A | 2/1995 | Deaton et al. |
| 5,389,964 A | 2/1995 | Oberle et al. |
| 5,396,417 A | 3/1995 | Burks et al. |
| 5,401,946 A | 3/1995 | Weinblatt |
| RE34,915 E | 4/1995 | Nichtberger et al. |
| 5,404,161 A | 4/1995 | Douglass et al. |
| 5,404,505 A | 4/1995 | Levinson |
| 5,404,523 A | 4/1995 | DellaFera et al. |
| 5,406,475 A | 4/1995 | Kouchi et al. |
| 5,408,417 A | 4/1995 | Wilder |
| 5,412,191 A | 5/1995 | Baitz et al. |
| 5,412,416 A | 5/1995 | Nemirofsky |
| 5,416,842 A | 5/1995 | Aziz |
| 5,420,606 A | 5/1995 | Begum et al. |
| 5,426,594 A | 6/1995 | Wright et al. |
| 5,430,644 A | 7/1995 | Deaton et al. |
| 5,438,355 A | 8/1995 | Palmer |
| 5,440,262 A | 8/1995 | Lum et al. |
| 5,442,771 A | 8/1995 | Filepp et al. |
| 5,446,916 A | 8/1995 | Derovanessian et al. |
| 5,446,919 A | 8/1995 | Wilkins |
| 5,448,471 A | 9/1995 | Deaton et al. |
| 5,459,306 A | 10/1995 | Stein et al. |
| 5,463,625 A | 10/1995 | Yasrebi |
| 5,471,629 A | 11/1995 | Risch |
| RE35,117 E | 12/1995 | Rando et al. |
| 5,483,049 A | 1/1996 | Schulze, Jr. |
| 5,483,278 A | 1/1996 | Strubbe et al. |
| 5,488,423 A | 1/1996 | Walkingshaw et al. |
| 5,490,060 A | 2/1996 | Malec et al. |
| 5,491,838 A | 2/1996 | Takahisa et al. |
| 5,498,003 A | 3/1996 | Gechter |
| 5,499,046 A | 3/1996 | Schiller et al. |
| 5,500,514 A | 3/1996 | Veeneman et al. |
| 5,500,681 A | 3/1996 | Jones |
| 5,502,636 A | 3/1996 | Clarke |
| 5,504,519 A | 4/1996 | Remillard |
| 5,504,675 A | 4/1996 | Cragun et al. |
| 5,508,731 A | 4/1996 | Kohorn |
| 5,510,859 A | 4/1996 | Douglass et al. |
| 5,511,160 A | 4/1996 | Robson |
| 5,513,102 A | 4/1996 | Auriemma |
| 5,513,109 A | 4/1996 | Fujishima |
| 5,515,098 A | 5/1996 | Carles |
| 5,515,270 A | 5/1996 | Weinblatt |
| 5,523,794 A | 6/1996 | Mankovitz et al. |
| 5,528,490 A | 6/1996 | Hill |
| 5,535,118 A | 7/1996 | Chumbley |
| 5,537,314 A | 7/1996 | Kanter |
| 5,537,586 A | 7/1996 | Amram et al. |
| 5,546,523 A | 8/1996 | Gatto |
| 5,550,657 A | 8/1996 | Tanaka et al. |
| 5,550,734 A | 8/1996 | Tarter et al. |
| 5,557,518 A | 9/1996 | Rosen |
| 5,557,721 A | 9/1996 | Fite et al. |
| 5,564,073 A | 10/1996 | Takahisa |
| 5,566,353 A | 10/1996 | Cho et al. |
| 5,570,465 A | 10/1996 | Tsakanikas |
| 5,572,643 A | 11/1996 | Judson |
| 5,577,266 A | 11/1996 | Takahisa et al. |
| 5,579,537 A | 11/1996 | Takahisa |
| 5,581,764 A | 12/1996 | Fitzgerald et al. |
| 5,583,563 A | 12/1996 | Wanderscheid et al. |
| 5,584,025 A | 12/1996 | Keithley et al. |
| 5,592,378 A | 1/1997 | Cameron et al. |
| 5,592,379 A | 1/1997 | Finfrock et al. |
| 5,592,560 A | 1/1997 | Deaton et al. |
| 5,594,493 A | 1/1997 | Nemirofsky |
| 5,594,910 A | 1/1997 | Filepp et al. |
| 5,600,366 A | 2/1997 | Schulman |
| 5,604,542 A | 2/1997 | Dedrick |
| 5,612,527 A | 3/1997 | Ovadia |
| 5,612,730 A | 3/1997 | Lewis |
| 5,612,868 A | 3/1997 | Off et al. |
| 5,617,565 A | 4/1997 | Augenbraun et al. |
| 5,621,812 A | 4/1997 | Deaton et al. |
| 5,634,101 A | 5/1997 | Blau |
| 5,636,346 A | 6/1997 | Saxe |
| 5,638,457 A | 6/1997 | Deaton et al. |
| 5,642,484 A | 6/1997 | Harrison et al. |
| 5,642,485 A | 6/1997 | Deaton et al. |
| 5,644,723 A | 7/1997 | Deaton et al. |
| 5,647,677 A | 7/1997 | Smith |
| 5,649,114 A | 7/1997 | Deaton et al. |
| 5,652,421 A | 7/1997 | Veeneman et al. |
| 5,659,469 A | 8/1997 | Deaton et al. |
| 5,661,517 A | 8/1997 | Budow et al. |
| 5,664,110 A | 9/1997 | Green et al. |
| 5,675,662 A | 10/1997 | Deaton et al. |
| 5,679,938 A | 10/1997 | Templeton et al. |
| 5,679,940 A | 10/1997 | Templeton et al. |
| 5,687,322 A | 11/1997 | Deaton et al. |
| 5,689,100 A | 11/1997 | Carrithers et al. |
| 5,696,965 A | 12/1997 | Dedrick |
| 5,697,844 A | 12/1997 | Von Kohorn |
| 5,701,252 A | 12/1997 | Facchin et al. |
| 5,701,451 A | 12/1997 | Rogers et al. |
| 5,706,507 A | 1/1998 | Schloss |
| 5,708,780 A | 1/1998 | Levergood et al. |
| 5,708,782 A | 1/1998 | Larson et al. |
| 5,710,884 A | 1/1998 | Dedrick |
| 5,710,886 A | 1/1998 | Christensen et al. |
| 5,710,887 A | 1/1998 | Chelliah et al. |
| 5,712,979 A | 1/1998 | Graber et al. |
| 5,713,795 A | 2/1998 | Kohorn |
| 5,715,314 A | 2/1998 | Payne et al. |
| 5,715,399 A | 2/1998 | Bezos |
| 5,717,860 A | 2/1998 | Graber et al. |
| 5,717,923 A | 2/1998 | Dedrick |
| 5,721,908 A | 2/1998 | Lagarde et al. |
| 5,724,424 A | 3/1998 | Gifford |
| 5,724,521 A | 3/1998 | Dedrick |
| 5,727,153 A | 3/1998 | Powell |
| 5,734,823 A | 3/1998 | Saigh et al. |
| 5,734,838 A | 3/1998 | Robinson et al. |
| 5,740,549 A | 4/1998 | Reilly et al. |
| 5,752,238 A | 5/1998 | Dedrick |
| 5,752,246 A | 5/1998 | Rogers et al. |
| 5,754,787 A | 5/1998 | Dedrick |
| 5,754,938 A | 5/1998 | Herz et al. |
| 5,754,939 A | 5/1998 | Herz et al. |
| 5,754,949 A | 5/1998 | Kumagai et al. |
| 5,758,257 A | 5/1998 | Herz et al. |
| 5,758,328 A | 5/1998 | Giovannoli |
| 5,759,101 A | 6/1998 | Von Kohorn |
| 5,761,601 A | 6/1998 | Nemirofsky et al. |
| 5,761,648 A | 6/1998 | Golden et al. |
| 5,761,662 A | 6/1998 | Dasan |
| 5,768,521 A | 6/1998 | Dedrick |
| 5,774,170 A | 6/1998 | Hite et al. |
| 5,774,868 A | 6/1998 | Cragun et al. |
| 5,774,869 A | 6/1998 | Toader |
| 5,774,870 A | 6/1998 | Storey |
| 5,791,991 A | 8/1998 | Small |
| 5,793,497 A | 8/1998 | Funk |
| 5,793,849 A | 8/1998 | Young et al. |
| 5,794,207 A | 8/1998 | Walker et al. |
| 5,794,210 A | 8/1998 | Goldhaber et al. |
| 5,796,393 A | 8/1998 | MacNaughton et al. |
| 5,796,945 A | 8/1998 | Tarabella |
| 5,796,952 A | 8/1998 | Davis et al. |
| 5,797,127 A | 8/1998 | Walker et al. |
| 5,802,497 A | 9/1998 | Manasse |
| 5,806,044 A | 9/1998 | Powell |
| 5,806,045 A | 9/1998 | Biorge et al. |
| 5,809,242 A | 9/1998 | Shaw et al. |
| 5,812,647 A | 9/1998 | Beaumont et al. |
| 5,812,668 A | 9/1998 | Weber |

(56) References Cited

U.S. PATENT DOCUMENTS

| | | |
|---|---|---|
| 5,812,769 A | 9/1998 | Graber et al. |
| 5,812,776 A | 9/1998 | Gifford |
| 5,815,657 A | 9/1998 | Williams et al. |
| 5,822,735 A | 10/1998 | De Lapa et al. |
| 5,826,244 A | 10/1998 | Huberman |
| 5,832,457 A | 11/1998 | O'Brien et al. |
| 5,832,458 A | 11/1998 | Jones |
| 5,832,459 A | 11/1998 | Cameron et al. |
| 5,835,087 A | 11/1998 | Herz et al. |
| 5,838,790 A | 11/1998 | McAuliffe et al. |
| 5,838,906 A | 11/1998 | Doyle et al. |
| 5,839,117 A | 11/1998 | Cameron et al. |
| 5,845,259 A | 12/1998 | West et al. |
| 5,848,396 A | 12/1998 | Gerace |
| 5,850,446 A | 12/1998 | Berger et al. |
| 5,855,007 A | 12/1998 | Jovicic et al. |
| 5,855,008 A | 12/1998 | Goldhaber et al. |
| 5,857,175 A | 1/1999 | Day et al. |
| 5,859,414 A | 1/1999 | Grimes et al. |
| 5,862,325 A | 1/1999 | Reed et al. |
| 5,864,825 A | 1/1999 | Kobayashi et al. |
| RE36,116 E | 2/1999 | McCarthy |
| 5,870,721 A | 2/1999 | Norris |
| 5,870,723 A | 2/1999 | Pare, Jr. et al. |
| 5,870,724 A | 2/1999 | Lawlor et al. |
| 5,873,068 A | 2/1999 | Beaumont et al. |
| 5,878,222 A | 3/1999 | Harrison |
| 5,880,769 A | 3/1999 | Nemirofsky et al. |
| 5,884,277 A | 3/1999 | Khosla |
| 5,884,278 A | 3/1999 | Powell |
| 5,884,309 A | 3/1999 | Vanechanos, Jr. |
| 5,887,271 A | 3/1999 | Powell |
| 5,889,863 A | 3/1999 | Weber |
| 5,890,137 A | 3/1999 | Koreeda |
| 5,890,152 A | 3/1999 | Rapaport et al. |
| 5,892,827 A | 4/1999 | Beach et al. |
| 5,893,075 A | 4/1999 | Plainfield et al. |
| 5,901,287 A | 5/1999 | Bull et al. |
| 5,903,874 A | 5/1999 | Leonard et al. |
| 5,905,246 A | 5/1999 | Fajkowski |
| 5,907,704 A | 5/1999 | Gudmundson et al. |
| 5,907,830 A | 5/1999 | Engel et al. |
| 5,907,831 A | 5/1999 | Lotvin et al. |
| 5,909,023 A | 6/1999 | Ono et al. |
| 5,909,673 A | 6/1999 | Gregory |
| 5,913,215 A | 6/1999 | Rubinstein et al. |
| 5,914,712 A | 6/1999 | Sartain et al. |
| 5,915,007 A | 6/1999 | Klapka |
| 5,915,243 A | 6/1999 | Smolen |
| 5,916,024 A | 6/1999 | Von Kohorn |
| 5,918,014 A | 6/1999 | Robinson |
| 5,918,211 A | 6/1999 | Sloane |
| 5,918,213 A | 6/1999 | Bernard et al. |
| 5,923,016 A | 7/1999 | Fredregill et al. |
| 5,923,552 A | 7/1999 | Brown et al. |
| 5,924,080 A | 7/1999 | Johnson |
| 5,926,795 A | 7/1999 | Williams |
| 5,931,917 A | 8/1999 | Nguyen et al. |
| 5,933,811 A | 8/1999 | Angles et al. |
| 5,933,827 A | 8/1999 | Cole et al. |
| 5,943,424 A | 8/1999 | Berger et al. |
| 5,948,040 A | 9/1999 | DeLorme et al. |
| 5,948,061 A | 9/1999 | Merriman et al. |
| 5,950,173 A | 9/1999 | Perkowski |
| 5,956,027 A | 9/1999 | Krishnamurthy |
| 5,963,924 A | 10/1999 | Williams et al. |
| 5,970,469 A | 10/1999 | Scroggie et al. |
| 5,970,472 A | 10/1999 | Allsop et al. |
| 5,974,396 A | 10/1999 | Anderson et al. |
| 5,974,399 A | 10/1999 | Giuliani et al. |
| 5,978,013 A | 11/1999 | Jones et al. |
| 5,978,840 A | 11/1999 | Nguyen et al. |
| 5,979,757 A | 11/1999 | Tracy et al. |
| 5,982,891 A | 11/1999 | Ginter et al. |
| 5,982,892 A | 11/1999 | Hicks et al. |
| 5,983,196 A | 11/1999 | Wendkos |
| 5,983,208 A | 11/1999 | Haller et al. |
| 5,987,132 A | 11/1999 | Rowney |
| 5,987,504 A | 11/1999 | Toga |
| 5,991,735 A | 11/1999 | Gerace |
| 5,992,888 A | 11/1999 | North et al. |
| 5,995,015 A | 11/1999 | DeTemple et al. |
| 5,995,942 A | 11/1999 | Smith et al. |
| 5,996,076 A | 11/1999 | Rowney et al. |
| 5,999,912 A | 12/1999 | Wodarz et al. |
| 5,999,914 A | 12/1999 | Blinn et al. |
| 6,002,394 A | 12/1999 | Schein et al. |
| 6,002,767 A | 12/1999 | Kramer |
| 6,002,771 A | 12/1999 | Nielsen |
| 6,006,197 A | 12/1999 | D'Eon et al. |
| 6,009,410 A | 12/1999 | LeMole et al. |
| 6,009,411 A | 12/1999 | Kepecs |
| 6,012,038 A | 1/2000 | Powell |
| 6,012,039 A | 1/2000 | Hoffman et al. |
| 6,014,634 A | 1/2000 | Scroggie et al. |
| 6,016,509 A | 1/2000 | Dedrick |
| 6,021,362 A | 2/2000 | Maggard et al. |
| 6,026,368 A | 2/2000 | Brown et al. |
| 6,026,369 A | 2/2000 | Capek |
| 6,026,370 A | 2/2000 | Jermyn |
| 6,029,141 A | 2/2000 | Bezos et al. |
| 6,029,142 A | 2/2000 | Hill |
| 6,039,244 A | 3/2000 | Finsterwald |
| 6,041,308 A | 3/2000 | Walker et al. |
| 6,041,309 A | 3/2000 | Laor |
| 6,047,263 A | 4/2000 | Goodwin, III |
| 6,049,778 A | 4/2000 | Walker et al. |
| 6,055,513 A | 4/2000 | Katz et al. |
| 6,055,542 A | 4/2000 | Nielsen et al. |
| 6,055,573 A | 4/2000 | Gardenswartz et al. |
| 6,061,660 A | 5/2000 | Eggleston et al. |
| 6,073,105 A | 6/2000 | Sutcliffe et al. |
| 6,075,971 A | 6/2000 | Williams et al. |
| 6,076,068 A | 6/2000 | DeLapa et al. |
| 6,076,069 A | 6/2000 | Laor |
| 6,105,002 A | 8/2000 | Powell |
| 6,112,988 A | 9/2000 | Powell |
| 6,119,101 A | 9/2000 | Peckover |
| 6,119,933 A | 9/2000 | Wong et al. |
| 6,123,647 A | 9/2000 | Mitchell |
| 6,129,274 A | 10/2000 | Suzuki |
| 6,131,087 A | 10/2000 | Luke et al. |
| 6,134,532 A | 10/2000 | Lazarus et al. |
| 6,138,911 A | 10/2000 | Fredregill et al. |
| 6,141,010 A | 10/2000 | Hoyle |
| 6,151,600 A | 11/2000 | Dedrick |
| 6,185,541 B1 | 2/2001 | Scroggie et al. |
| 6,230,143 B1 | 5/2001 | Simons et al. |
| 6,237,145 B1 | 5/2001 | Narasimhan et al. |
| 6,266,649 B1 | 7/2001 | Linden et al. |
| 6,282,516 B1 | 8/2001 | Giuliani |
| 6,298,330 B1 | 10/2001 | Gardenswartz et al. |
| 6,321,208 B1 | 11/2001 | Barnett et al. |
| 6,330,543 B1 | 12/2001 | Kepecs |
| 6,336,099 B1 | 1/2002 | Barnett et al. |
| 7,013,286 B1 * | 3/2006 | Aggarwal et al. .......... 705/14.26 |
| 7,240,843 B2 | 7/2007 | Paul et al. |
| 7,401,032 B1 | 7/2008 | Golden et al. |
| 7,640,183 B1 | 12/2009 | Burns |
| 8,050,969 B2 | 11/2011 | Golden et al. |
| 8,099,109 B2 | 1/2012 | Altman et al. |
| 8,160,929 B1 | 4/2012 | Park et al. |
| 2001/0018522 A1 | 8/2001 | Fauchere et al. |
| 2001/0054066 A1 | 12/2001 | Spitzer |
| 2002/0130179 A1 | 9/2002 | Walker et al. |
| 2002/0178051 A1 | 11/2002 | Golden et al. |
| 2003/0018522 A1 | 1/2003 | Denimarck et al. |
| 2003/0154125 A1 | 8/2003 | Mittal et al. |
| 2004/0193487 A1 | 9/2004 | Purcell et al. |
| 2005/0033639 A1 | 2/2005 | Myers |
| 2005/0075926 A1 | 4/2005 | Liu et al. |
| 2005/0234771 A1 * | 10/2005 | Register et al. .................. 705/14 |
| 2006/0053437 A1 * | 3/2006 | Bruner ............................ 705/14 |
| 2007/0288313 A1 | 12/2007 | Brodson et al. |

(56) References Cited

U.S. PATENT DOCUMENTS

| | | | |
|---|---|---|---|
| 2008/0288353 | A1 | 11/2008 | Golden et al. |
| 2009/0106115 | A1 | 4/2009 | James et al. |
| 2010/0042490 | A1* | 2/2010 | Boal .................... 705/14.22 |
| 2010/0088170 | A1 | 4/2010 | Glore, Jr. |
| 2010/0309505 | A1 | 12/2010 | Partridge et al. |
| 2011/0153410 | A1* | 6/2011 | Muthugopalakrishnan et al. .................... 705/14.39 |
| 2011/0313839 | A1 | 12/2011 | Walsh |
| 2012/0029998 | A1 | 2/2012 | Aversano et al. |
| 2012/0123847 | A1 | 5/2012 | Wane et al. |
| 2013/0006753 | A1 | 1/2013 | Bennett et al. |
| 2013/0204690 | A1 | 8/2013 | Liebmann |

FOREIGN PATENT DOCUMENTS

| | | |
|---|---|---|
| CA | 2 405 148 A1 | 10/2001 |
| CA | 2 408 278 A1 | 11/2001 |
| CA | 2 619 603 A1 | 2/2007 |
| CA | 2 672 294 A1 | 7/2008 |
| CA | 2 684 094 A1 | 11/2008 |
| EP | 0113022 B1 | 5/1989 |
| EP | 0 825 619 | 2/1998 |
| EP | 0 512 509 | 7/1999 |
| EP | 0 822 535 | 2/2006 |
| FR | 0512509 | 5/1992 |
| GB | 1287304 | 8/1972 |
| GB | 1437883 | 6/1976 |
| GB | 2034995 | 10/1979 |
| GB | 2105075 | 5/1982 |
| GB | 2141907 A | 1/1985 |
| GB | 2185670 | 7/1987 |
| GB | 2195670 A | 4/1988 |
| GB | 2207314 A | 1/1989 |
| GB | 2256549 A | 12/1992 |
| GB | 2281434 A | 3/1995 |
| JP | 3-204259 | 9/1991 |
| JP | 4-250591 | 9/1992 |
| JP | 6-314184 | 11/1994 |
| JP | 07-181891 | 7/1995 |
| JP | 07-306654 | 11/1995 |
| JP | 08-115361 | 5/1996 |
| JP | 09-231263 | 9/1997 |
| JP | 10-143563 | 5/1998 |
| JP | 10-187320 | 7/1998 |
| WO | WO 85/01373 | 3/1985 |
| WO | WO 88/04507 | 6/1988 |
| WO | WO 90/07844 | 7/1990 |
| WO | WO 92/12488 | 7/1992 |
| WO | WO 92/20030 | 11/1992 |
| WO | WO 93/09631 | 5/1993 |
| WO | WO 93/12566 | 6/1993 |
| WO | WO 93/15466 | 8/1993 |
| WO | WO 93/19427 | 9/1993 |
| WO | WO 94/27231 | 11/1994 |
| WO | WO 95/03570 | 2/1995 |
| WO | WO 95/16971 | 6/1995 |
| WO | WO 95/31069 | 11/1995 |
| WO | WO 96/30864 | 10/1996 |
| WO | WO 96/34466 | 10/1996 |
| WO | WO 96/36141 | 11/1996 |
| WO | WO 97/05555 | 2/1997 |
| WO | WO 97/23838 | 7/1997 |
| WO | WO 97/30409 | 8/1997 |
| WO | WO 97/31322 | 8/1997 |
| WO | WO 98/18093 | 4/1998 |
| WO | WO 99/12115 | 3/1999 |
| WO | WO 99/52055 | 10/1999 |
| WO | WO-2006/075219 A2 | 7/2006 |
| WO | WO 2009/140444 A2 | 11/2009 |

OTHER PUBLICATIONS

U.S. Appl. No. 09/290,441, filed Apr. 13, 1999.
U.S. Appl. No. 90/005,641, filed Feb. 18, 2000, Golden et al.
U.S. Appl. No. 12/157,053, filed Jun. 6, 2008, Golden et al.
Tomlin, Kenny, "Rockfish Blog," Rockfish Technology—Online Coupon Management, http://rockfishblog.com/entries/2009/9/18/rockfish_technology.aspx, Feb. 10, 2010.
Declaration of Simon Higgs, *Internet Coupon Solutions LLC v. Coupons.com Incorporated, News America Marketing Interactive, LLC, ValPak Direct Marketing Systems, Inc. and Valassis Communications, Inc.*, Civil Action No. 6:09-cv-00261, Apr. 21, 2010.
Declaration of Michael Golino, *Internet Coupon Solutions LLC v. Coupons.com Incorporated, News America Marketing Interactive, LLC, ValPak Direct Marketing Systems, Inc. and Valassis Communications, Inc.*, Civil Action No. 6:09-cv-00261, Judge Leonard Davis, Sep. 2, 2009.
Fawcett, "Trading Scissors for Modems" *Advertising Age*, Jun. 6, 1995.
Shermach, "Electronic Coupon Program Offers Data-Base Potential," 25, 1995. *Marketing News*, Sep. 25, 1995.
Coupons Online, A Division of Interactive Database Marketing Company, 9-page brochure.
Dworsky, E., "Consumer World Launch on the Internet," *M2 Presswire*, M-2 Communications, Ltd., Sep. 26, 1995.
Broadcasting & Cable, 125(30), Jul. 24, 1995, Bernicker, "Nielsen Plans Internet Service," p. 34.
Proceedings International Conference on Tools with Artificial Intelligence, Jan. 1995, Pazzani et al., "Learning from Hotlists and Coldlists: Towards a WWW Information Filtering and Seeking Agent," pp. 402-495.
Paper presented at the USENIX Technical Conference, New Orleans, LA, Jan. 1995, Yan et al., "SIFT—A Tool for Wide-Area Information Dissemination," pp. 177-186.
Advertisement as appeared in the New York Times, Business Section, Jun. 21, 1995, "Online Coupon Delivery.".
Uniform Code Council, Inc.., Sep. 1994, "U.P.C. Coupon Code Guidelines Manual," pp. 1:30-39.
Porter, Arthur L. "Strengthening coupon offers by requiring more from the customer," Journal of Consumer Marketing, V. 10, N. 2, pp. 13-18, 1993.
Shani, Davi, "Exploiting niches using relationship marketing," Journal of Business and Industrial Marketing, V.8, N. 4, pp. 58-66, 1993.
Uniform Code Council, Inc.®, The Global Language of Business, http://www.uc-council.org, 2003. Home Page, one page.
CERN http Reference Manual, A Guide to a World-Wide Web Hyper Text Daemon (Apr. 1994).
How to Set Up a World Wide Web Site, The Guide for Information Providers, Lincoln D. Stein (1995).
Nikkei Multimedia for Business (Sep. 1998), No. 38, pp. 66-71.
Nikkei Multimedia for Business (Mar. 1998) No. 32, pp. 119-123.
Nikkei PC21, vol. 3, No. 10, pp. 228-231, Nikkei PB, 1998.
Wilbert, Tony "Now Shoppers Can Clip Coupons Off the Internet" Atlanta Business Chronicle.
Email from Mike Kacaba Regarding Phase One Requirements Document Version 1.0, dated Sep. 19, 1995 and Draft Requirements Document Attached to that Email.
Egner, "High-Tech Calling at Home Shopping Network," Florida Business-Tampa Bay, vol. 5, No. 6, S1, Jun. 1990, p. 20.
Lynch, "ONLINE//Put away the scissors: Try coupons on the Web, "Sep. 25, 1995, Orange County Register, Morning Edition, d. 24 [retrieved on Oct. 9, 2002], Internet URL:htp//global.umi.com/pqdweb?Did=000000020851557&Fmt=3&Deli=1&Md=1&Idx+1&Sid=1&RQt=309.
Kikuchi et al., "Surging Online Products," Nikkei Communications, No. 212, Nikkei Business Publications, Inc. Dec. 18, 1995, pp. 136 to 140.
Uesato et al., "An Information system changes a market of an electronic commerce, "Nikkei Computer No. 375 Nikkei Business Publications, Inc. of Oct. 2, 1995, pp. 80 to 91.
Zakon, "Hobbes Internet Timeline," http://www.zakon.org/robert/internet/timeline, accessed Apr. 1, 2003, 33 pages.
Kamiba, "The Karaoke Chronicle: an interactive personal newspaper by the use of an agent function over WWW," Report by Association of Information Processing, vol. 95, No. 115, Dec. 1, 1995, pp. 13-18.
Morris, "HTML for Fun and Profit," Sun Microsystems, Inc. pp. 169-170.

(56) References Cited

OTHER PUBLICATIONS

San Francisco Reservations, "Leave the Hotels in San Francisco to Us" Internet Magazine, No. 2, Dec. 18, 1994, Impress Corporation, pp. 126-127.
Sep. 19, 1999 Memorandum Re: Phase 1 Functional Requirements for Catalina Online.
Jun. 15, 1989, "In this Computer Age, Who Needs Coupons?" The New York Times.
Dec. 1992, "Interactive Cable System Receives Strong Response" Direct Marketing, pp. 9-10.
May 9, 1994, "SLED Internet Directory Distributes Electronic Coupons" PR Newswire.
May 16, 1994 "SLED InterNIC Debut Internet Services" PC Week p. 130.
May 1994, David Bank "Email Marketing Firm Using Discount Strategy" San Jose Mercury News.
Sep. 25, 1995, "Electronic Coupon Program Offers Database Potential" Marketing News.
Dec. 8, 1995, H.G. Lewis "Cruising Down the Hyper Space Road: How to Write Copy for the (GULP!) Internet" Direct Marketing, vol. 58 No. 8, pp. 14-15.
Feb. 11, 1996, Catalina Marketing Online Launch to include More than 1,600 California Stores Catalina Marketing Corporation Newsletter.
Apr. 19, 1996, "San Jose Customers Can Now Plan Supermarket Shopping in Cyberspace—New Internet Service Saves Shoppers Time and Money" Catalina Marketing Corporation Newsletter.
Apr. 19, 1996, "Cruising for Food Savings on the Internet" San Diego Union-Tribune, p. C1.
Jun. 1, 1996, Laurie Peterson, "Click Here for Coupons" Direct p. 45.
Jun. 13, 1996, "PNC Bank Announces Internet Site, Plans Comprehensive Service Expansion" Business Wire.
Nov. 4, 1996, John Fontant "$2^{nd}$ Net Bank Opens for Business" Communicationsweek, p. 46.
Apr. 1997, R. Resnick, "The Case for 'Opt In' Marketing on the Internet" Direct Marketing, vol. 59, No. 12 pp. 52-53.
Aug. 5, 1997, "Internet Coupon Security Breakthrough Removes Major Obstacle to Online Packaged Goods Advertising" SuperMarkets Online.
Dec. 1, 1997, "Internet and Food Industries Embrace Secure Online Coupon Format" SuperMarkets Online.
Sep. 30, 1998, "IntelliQuest and Coolsavings Offer Innovative Online Customer Relationship Management Program for Technology Vendors" Business Wire.
Oct. 20, 1998, "IntelliQuest Looks for Interaction with Loyalty, Web Traffic Programs" Electronic Advertising & Marketplace Report.
Mar. 1999, www.freesamples.com. Reprinted on Oct. 3, 2001, by Rebecca Brimmer, since the original copy could not be found.
Carlene A. Thissen, "Clearing Up Questions in Coupons Clearing".
International Search Report for PCT/US96/20497, International Filing Date Dec. 23, 1996, Priority Date Dec. 26, 1995.
International Search Report for PCT/US01/19204, International Filing Date Jun. 15, 2001, Priority Date Jun. 19, 2000.
Plaintiff's Exhibit # 63, Notice of Subpoena Duces Tecum, Case No. CIV 00-01714 RSWL (JWJx).
Deposition Exhibit # 6, Notice of Deposition of Coolsavings.com, Inc. Pursuant to F.R.C.P. 30(b)(6), Case No. CV 00-01714.
Deposition Exhibit # 2, Notice of Deposition of Coolsavings.Com. Inc. Pursuant to F.R.C.P. 30(b)(6), Case No. CV 00-01714 RSWL (JWJx).
Order Staying Proceedings Pending Reexamination, Case No. CV 00-01714 (JWJx).
Complaint for Patent Infringement 35 U.S.C. §§ 271, 281, 283, 284 and 285, CV 00-01714.
Coolsavings' Answer and Counterclaim to Complaint, Case No. 00-01714 RSWL.
Supermarkets Online's Reply to Counterclaim, Case No. 00-01714 RSWL.
Coolsavings' Supplemental Answers and Objections to Supermarkets Online, Inc.'s Interrogatories Nos. 1-5, case No. 00-01714 (JWJx).
Coolsavings' Supplemental Responses and Objections Supermarkets Online Inc.'s Second Set of Interrogatories Nos. 6-17, Case No. 00-01714 RSWL (JWJx).
Letter from Russell J. Genet at Jenkins & Gilchrist, to the USPTO dated Oct. 17, 2001.
Newspaper article internet printout, "Checking Out the Customer, New Technology Can Give Stores Detailed Knowledge About Buyers' Habits," *The Washington Post*, Jul. 9, 1989, 8 pp. (Already made of record).
Magazine article internet printout, "Coupon Clippers, save your scissors," *Business Week*, Jun. 20, 1994, 3 pp. (Already made of record).
Newspaper article Internet printout, "American Express Applies for a New Line of Credit," *The New York Times*, Jul. 30, 1995. (Already made of record).
Moeller, M., "Let's Hang Out at the E-Mall," *PC Week*, vol. 12, No. 44, Nov. 6, 1995, p. 75 (1).
Porter, A.L., "Strengthening coupon offers by requiring more from the customer," *J. Consumer Goods*, vol. 10, No. 2, 1993, pp. 13-18.
Shani, D. and Chalasani, S., "Exploiting niches using relationship marketing," *J. Business & Industrial Marketing*, vol. 8, No. 4, 1993, pp. 58-66.
"Online Coupon Delivery", Advertisement as appeared in the New York Times, Business Section, Jun. 21, 1995.
Advertisement as appeared in the *New York Times*, "Online Coupon Delivery", Business Section, Jun. 21, 1995.
Uniform Code Counsel, Inc., "UPC Coupon Code Guidelines Manual," Sep. 1994, pp. 1:30-39.
Shermach, "Electronic Coupon Program Offers Data-Base Potential," *Marketing News*, Sep. 25, 1995.
Printout from *netValue*, (2 pages), received from the World Wide Web, Copyright 1997.
*Coupons Online*, A Division of Interactive Database Marketing Company, 9 page brochure.
Bernicker, "Neilsen Plans Internet Service," *Broadcasting & Cable*, 125(30), Jul. 24, 1995, p. 34.
Pazzani et al., "Learning From Hotlists and Coldlists: Towards a WWW Information Filtering and Seeking Agent," *Proceedings International Conference on Tools With Artificial Intelligence*, Jan. 1995, pp. 492-495.
Yan et al., "SIFT—A Tool for Wide-Area Information Dissemination," Paper presented at the USENIX Technical Conference, New Orleans, LA, Jan. 1995, pp. 177-186.
European Search Report Dated Dec. 29, 1999, in Application No. EP969280130.
"New Citicorp Subsidiary Will Provide Information Services to Grocery Field", *Frozen Food Age*, New York, NY, Feb. 1987, pg. 1.
Klokis, Holly, "Ukrop's Tests Data Base Marketing Program" Electronic Couponing Tracks Buying Behavior of Valued Customers, *Chain Store Age Executive*, Sep. 1987, pp. 73-74.
Culnan, Mary J., "How Did They Get My Name?: An Exploratory Investigation of Consumer Attitudes Toward Secondary Information Use", *MIS Quarterly*, Sep. 1993, pp. 341-363.
International Search Report dated Dec. 3, 1999 in International Application No. PCT/US99/09960.
Wellman, David, "Painting the Target", from *Food & Beverage Marketing*, Sep. 1996, v15 n9, p. 16 (2).
Beyer, Leslie, "When Crime Pays", from *Grocery Headquarters*, Dec. 1997, v63, n12, p. 41 (3).
Ghose et al., "Interactive Functions and Their on the Appeal of Presences Sites", from *Journal of Advertising Research*, Mar./Apr. 1998, v38, n2, pp. 29-43.
Response Reward Systems, *Sports and Trivia*.
Response Reward Systems, Internet Casino, Ltd., Licensee under Response Reward patents covering Interactive Internet Games.
Response Reward Systems, L.C., Game Show and Quiz Programs.
Response Reward Systems, L.C., Vonkohorn Interactive Patents, Examples, Scenarios, Flowsheets and Claims selected from Patents covering Electronic Systems and Methods (reviewed as of Jan. 1, 1995).

(56) References Cited

OTHER PUBLICATIONS

Response Reward Systems, Interactive TV Technology, etc., Address by Henry Von Kohom to the Broadcasting Promotion and Marketing Executives Conference, Baltimore, Jun. 17, 1991.
Response Reward Systems, Interactive Television, Internet, Radio and Telephone Technologies (as of Jun. 1999).
Response Reward Systems, Interactive Response Reward Technology for Television, Radio and Telephone.
Response Reward Systems, Response Reward Television.
Response Reward Systems, Highlights of Interactive Technologies of Response Reward Systems L.C. For purposes of illustration, a number of selected patents are listed, Revised as of Oct. 31, 1997.
Response Reward Systems L.C., Response Reward Interactive In-Home Couponing Systems & Methods.
Response Reward Systems, The Response Reward Technology.
Response Reward Systems, Interactive Results with One Way Communication in Entertainment Televised Home Shopping Market Research Education.
Response Reward Systems, L.C., Summary of Patented Interactive Technologies in the fields of Marketing and Entertainment, as of Jun. 30, 1996.
Various Articles Concerning "ZING" Technology.
Various Articles Concerning Interactive TV/Couponing.
Various Articles Concerning On-Line Gaming/Lotteries.
Various Articles Concerning Marketing/On-Line Coupons.
PR Newswire, *USA: SLED* Internet Directory Distributes Electronic Coupons, Reuters Info. Svcs, May 9, 1994.
Saddler, Jeanne, "Computer Users Shop at Home Over the Phone", *The Wall Street Journal*, Feb. 20, 1985.
Staff Reporter, "NASD Has Transferred Issues to National List", *The Wall Street Journal*, Sep. 19, 1984.
Excerpt from *The Wall Street Journal*, of Feb. 12, 1985 (p. 52) Re: Comp-U-Card International.
Anderson, Kevin, "Comp-U-Card: Shopping Revolution", USA Today.
"New Video Game: Shopping", *The New York Times*, Apr. 26, 1984.
Wallace, Anise C., "Hunting for Bargains in a Dull Market", *The New York Times*, May 27, 1984.
Timberlane, Cotten, "Avon Calling—But It's by Machine", *McKeesports*, Pennsylvania News.
Lin, Jennifer, "Future Sell: Shopping by Computer", *The Philadelphia Inquirer*, Jan. 1, 1984.
Schiffres, Manuel, "Stretching Frontiers of Home Computers".
Excerpt from "Comp-U-Card Launches Test of Public-Access Interactive Shopping Kiosk", *DirecTech Report*, Feb. 1985 (vol. 2, No. 2).
Stepneski, Ron, "Computer is One-Step Comparison Shopper", *The Record Business*, Dec. 7, 1984.
Crocker, Chris, "Connect Time: Combating Shopping Mall Phobias", *Microcomputing* of Nov. 1984.
Feinberg, Samuel, "From Where I Sit", *Women's Wear Daily of* Aug. 28, 1984.
Petre, Peter, "The Man Who Computerized Bargain Hunting", Fortune of Jul. 9, 1984.
Kahn, Joseph, P. & Hartman, Curtis, Excerpt from *"New Faces of 1984"* Inc. of May 1984.
Watt, Peggy, "Electronic Mall Lets Consumers Shop at Home", *InfoWorld* of Apr. 9, 1984, vol. 6, Issue 15.
Schneider, Lois, "On Your Screen", *Electronic Publishing and Bookselling* of Mar. 1984.
"Comp-U-Mall Marks Next Step in Electronic Shopping", *ComputerWorld* (vol. XVIII, No. 4), of Jan. 23, 1984.
Gallant, John, "Comp-U-Card Plys High-tech Merchandising", *ComputerWorld* (vol. XVIII, No. 4), of Jan. 23, 1984.
Donaton, Scott, "New Media Digging Up Old Tools", *Advertising Age* of Jul. 1995.
Krakowka, Lisa, "Savings in Cyberspace", *Marketing Tools*, Oct. 1995.
Urbanski, Al, "Cents-Off Online", *Food & Beverage Marketing* of Sep. 1995.
McCready, Anne, "Electronic Coupon Dispensers At Many Dallas-Ft. Worth Stores", *Supermarket News* of Oct. 10, 1993.
Hansard, Donna Steph, "Arlington Distributing Firm Making a Coup With Coupons", *The Dallas Morning News* of Apr. 19, 1983.
Bell, Sally, "Blipped, Not Clipped".
Zuckerman, Steve, "Coupons Turning High-Tech", *Dallas Times Herald*, Jun. 18, 1983.
Naidus, Michael, "Mail Fraud Alleged in Coupon Scheme", *Newsday*, Aug. 8, 1985.
Kessler, Felix, "The Costly Coupon Craze", *Fortune*, Jun. 9, 1986.
Anderson, Keith, "Electronic Coupons a la Carte", *The Dallas Morning News*, Oct. 11, 1983.
Excerpt from *Business Notes*: "Coupons for the Computer Age", *Time*, Feb. 3, 1986.
Walker, Kelly, Excerpt from *Marketing*: "The Electronic Coupon", *Forbes*, Nov. 19, 1984.
Hille, Ed. & Bloom, Stephen, "Computers Give Supermarket Coupons", *The Dallas Morning News*.
Advertisement for: "EAN Introduces Electronic In-Store Coupons", *Advertising Age*, Jun. 27, 1983.
Advertisement for: "The Most Unique Couponing Vehicle Ever Created", *DuPont Consumer Habits Buying Study*.
Heller, Al, "Coupons by Computers", *Venture*, Apr. 1984.
"Preview of Food Marketing Institute's Annual Convention and Educational Exposition" held at the Dallas Convention Center, May 1984.
Anderson, Keith, Texas-Groceries Get Computers That Dispense Coupons, Eight at a Clip *Los Angeles Times*, Oct. 24, 1983.
Meyer, Ed, "Ringing in a New Era", *Advertising Age*, Dec. 12, 1983.
Article: Re: Video Coupons: "New Machines Dispense Coupons".
Coupons Online and CMS Profiles Overview, Nov. 1995, *CMS Inc.*
"Interactive Online Targeted Coupon Delivery . . ." from Coupons Online™, Jan. 1995.
The Inter-Act Promotion Network™: Program Overview.
"Kiosks Help Grand Union Cut Millions From Ad Budget", *ET* of Oct. 1997.
Neilsen, Jr., Arthur C., "The Growing Importance of Coupons-And How to Use Them Effectively", *NCH Reporter*, Nov. 1, 1983.
Outline of Assignment of American Consulting Corporation (AAC) to Electronic Advertising Network (EAN).
Coupon Systems, Inc. presents: "Electronic Marketing: An In-Store Service to Increase Product Sales".
Booth, Lynn, News Release from Comp-U-Card International, Inc., (Facts Sheet about the company).
Excerpt of "Technology Application", *Comp-U-Mall T.A.P. Report*, vol. 2, No. 2, Feb. 1985.
Example of Comp-U-Store Online Catalogue.
Comp-U-Card: Expanding a Concept . . . (Company overview).
Comp-U-Card International Incorporated Annual Report for year ending Jan. 31, 1984.
From Comp-U-Card, "The Shopping Machine: A New Concept in Retail Selling".
EAN Electronic Advertising Network, Inc. *"EAN Presentation Agenda"*.
"Couponing Comes of Age", *Electronic Advertising Network, Inc.*, 1983.
Bayer, Tom, "Supermarket Coupons Put At Consumer's Touch", *Advertising Age*, Mar. 12, 1984.
Lazarus, George, "The New Video Coupon Game", *Adweek*, Dec. 3, 1984, p. 10.
coolsavings.com vs. *E-Centives, Inc. and Ziff-Davis, Inc.*, Case No. 98 C 4924, In the United States District Court for the Northeastern District of Illinois Eastern Division, Expert Report of Mark E. Nusbaum.
Perth, 2nd *International Interactive Multimedia Symposium*, Western Australia, Jan. 23-28, 1994.
Arlen, Gary H., "Creating the Home Information Appliance", *Arlen Communications Inc.*, Mar. 1990.
"AT&T GIS and MEI offer in-store electronic coupon solution", News Release by AT&T, May 2, 1994.
"The Power of Targeted Marketing . . . at Mass Media Rates!", *Coupons Online*, from the World Wide Web.

(56) References Cited

OTHER PUBLICATIONS

Porter, Arthur L., "Strengthening Coupon Offers by Requiring More from the Customer", *Journal of Consumer Marketing*, vol. 10, No. 2, pp. 13-18, 1993.
Whalen, Jeanne, "Grocers build frequency, loyalty on coupon systems", *Advertising Age*, May 8, 1995.
Ratcliffe, Mitch, "Lucie; interactive information, advertising stands upright, prepares to walk", *Digital Media*, vol. 4, No. 1, Jun. 8, 1994.
Peppers, Don and Rogers, Ph.D., Martha, *The One to One Future: Building Relationships One Customer at a Time*, Currency Doubleday, Aug. 1993.
Armstrong, Larry, "Coupon clippers, save your scissors" *Business Week*, Jun. 20, 1994, vol. 18, No. 4, p. 164-166.
Sun, Lena H., "Checking Out the Customer; New Technology Can Give Stores Detailed Knowledge About Buyers' Habits", *The Washington Post*, Jul. 9, 1989, Financial; p. H1.
Soloman, Stephen D., "American Express Applies for a New Line of Credit" *The New York Times*, Jul. 30, 1995, Sec. 6; p. 34, col. 1; Magazine Desk.
*Coolsavings.com, Inc.*, Plaintiff, v. *E-Centives, Inc. and Ziff-Davis, Inc.*, Defendants. (Case No. 98 C 4924, Judge James M. Rosenbaum, Magistrate Judge Nolan).
*Coolsavings.com Inc.*, Plaintiff, v. *Catalina Marketing Corporation and Supermarkets Online, Inc.*, Defendants. (Case No. 98 C 6668, Judge John F. Grady, Magistrate Judge Nolan).
*Coolsavings.com Inc.*, Plaintiff, v. *Planet U, Inc. and Brodbeck Enterprises, Inc. d/b/a Dick's Supermarkets*, Defendants. (Case No. 98 C 6669, Judge Harry D. Leinenweber, Magistrate Judge Rosemond).
*Coolsavings.com Inc.*, Plaintiff v. *IQ.Commerce Corporation*, Defendant. (Case No. 98 C 7750, Hon. Ronald A. Guzman, Magistrate Judge Bobrick).
*Coolsavings.com Inc.*, Plaintiff, v. *H.O.T! Coupons, Inc.*, Defendant. (Case No. 98 C 7408, Judge Gottschall, Mag. Judge Keys).
*Coolsavings.com Inc.*, Plaintiff v. *Brightstreet.com, Inc.*, Defendant. (Case No. 99 C 5499, Honorable Judge Norgle, Magistrate Judge Keys).
Sep. 19, 1999 Memorandum Re: Phase I Functional Requirements for Catalina Online.
Elliott, Stuart, "A Last Hurdle for Shoppers: The Checkout-Counter Pitch", *N.Y. Times*, Jan. 11, 1993 ("1993 New York Times Article") (Exhibit 7).
netValue, Inc., *Welcome to netValue, Inc.*, from the World Wide Web.
"Acu-Trac and Cox Launch Interactive Couponing Service," *Electronic Marketplace Report*, Mar. 21, 1995, vol. 9, No. 6, Information Access Company, (2 pages).
Elliott, Stuart, "A Last Hurdle for Shoppers: The Checkout-Counter Pitch," NY Times, Jan. 11, 1993, The New York Times Company, (2 pages).
Nekkei Multimedia for Business, Sep. 1998 No. 38 (Japanese Publication—no translation available).
Nekkei Multimedia for Business Mar. 1998 No. 32 (Japanese Publication—no translation available).
www.archive.ord/about.about.php, Internet Archive, 10 page printout from web site, Jan. 10, 2003.
www.archive.org, five-page print out and from web site, Jan. 10, 2003.
Pages.alexa.com/company/index.html?p=Dest_W_t_40_B1, Alexa Web Search History, 2 pages, Jan. 10, 2003.
Printout of the Wayback Machine'S search result for http://performancebike.com conducted on Nov. 27, 2002.
Printout from www.verisign.com/corporate/news/apr_19980107.html describing network solutions, Inc.
www.wired.com/news/politics/0,1238,31551,00.HTML.
Printout from www.netsol.com's WHOIS search engine for www.PerformanceBike.com.
Printout of eight pages from the performancebike.com web site from Dec. 20 4, 1997, as stored in the Wayback Macnine.
Four-page Examiner affidavit supporting obviousness rejection contained in the official action mailed Dec. 18, 2002 in U.S. Appl. No. 09/526,535.
Claims U.S. Appl. No. 09/401,939.
Claims in U.S. Appl. No. 09/756,788.
Trammell, Gem, Supervisory Patent Examiner, TC3600 and Weinhardt, Bob, Quality Assurance Specialist, TC3600, "When Is Electronic Document a Printed Publication for Prior Art Purposes?" presented at the USPTO's Business Methods Partnership Meeting, Apr. 1, 2003, 32 pages.
Printout of 13 pages of the performancebike.com web site from Nov. 15, 1999 as stored in the Wayback Machine.
Office Actions from U.S. Appl. No. 09/526,535 dated Dec. 18, 2002 and Nov. 22, 2002 concerning Examiner reference of PerformanceBike.
Appeal Brief filed in response to examiners Dec. 18, 2002 office action.
U.S. Appl. No. 13/191,044, filed Jul. 26, 2011, Aversano.
U.S. Appl. No. 13/247,720, filed Sep. 28, 2011, Golden.
U.S. Appl. No. 13/253,590, filed Oct. 5, 2011, Christie.
Office Action dated Feb. 26, 2013 issued in connection with U.S. Appl. No. 13/470,179.
Office Action dated Sep. 17, 2013 issued in connection with U.S. Appl. No. 13/351,854.
Consumers Find More Ways to Save via Downloadable Coupons on Redplum.com; Valassis Investor—Press Releases, Dec. 15, 2011; 1 page.
In This Computer Age, Who Needs Coupons? The New York Times; Jun. 15, 1989.
Office Action issued in U.S. Appl. No. 13/247,720, dated Aug. 7, 2012.
Office Action mailed Apr. 4, 2012 in U.S. Appl. No. 13/247,720.
Office Action mailed Feb. 7, 2012 in U.S. Appl. No. 13/253,590.
U.S. Appl. No. 12/704,376, filed Feb. 11, 2010, Christie et al.
U.S. Appl. No. 13/351,854, filed Jan. 17, 2012, Henri Lellouche.
U.S. Appl. No. 13/470,179, filed May 11, 2012, Christie et al.
Office Action dated May 15, 2013 issued in connection with U.S. Appl. No. 13/191,044.
Notice of Allowance dated Oct. 12, 2012 issued in connection with U.S. Appl. No. 13/247,720.
Office Action dated Oct. 19, 2012 issued in connection with U.S. Appl. No. 13/470,179.
Office Action dated Jan. 6, 2014 issued in connection with U.S. Appl. No. 13/351,854.

* cited by examiner

SECURE COUPON DISTRIBUTION

FIELD OF THE INVENTION

Various embodiments relate generally to the field of coupon generation and distribution. More particularly, various embodiments relate to secure and validated coupon generation and distribution, and the prevention of fraudulent coupon printing.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Traditional marketing approaches have included the use of discount offers distributed to consumers in the form of paper or printed discount certificates commonly referred to as coupons. Such coupons are generally distributed via, e.g., mailers or newspaper cutouts, or presented to consumers at a retail location. These coupons typically contain transactional data describing a particular transaction enabled by the coupon, such as a product's description, the coupon's amount or value, an expiration date, etc. Additionally, such coupons may contain certain identification data, e.g., various numbers, letters, barcodes or other symbols sufficient to uniquely identify the coupon and/or the product or service to be discounted. For example, upon presentation of a coupon at a point-of-sale terminal, the coupon could be scanned or otherwise identified and the requisite discount or value associated with the coupon could be applied to a purchased product.

With the advent of the Internet, online shopping and advertising has become more prevalent. For example, many retailers now maintain websites to allow consumers to shop online for products and/or obtain certain information related to such products. Additionally, many businesses now also provide coupons to consumers in an electronic format. That is, coupons can be sent to consumers via email, where the email contains a graphic representation of a coupon that can be printed by the consumer at his/her local printer. The printed coupon can then be taken to a retail location and redeemed by the consumer.

Due to the nature of these conventional electronic coupons and the manner in which they are distributed, it is easy to redistribute them to other consumers, some or all of whom may not necessarily be authorized to take advantage of the associated discounts offers. For example, retailers may require consumers to register at their website in order to receive coupons that are periodically sent via email. However, the registered consumers may then forward the email to other consumers, e.g., family or friends, who have not registered with the retailer and thus, are not authorized to receive and redeem the coupons. Additionally, registered consumers may post Uniform Resource Locators (URLs)/links to the electronic coupons on certain "coupon websites" or online blogs so that any visitor to the coupon website or blog can take advantage of any posted electronic coupon. Because the electronic coupons are being posted outside of a retailer's or coupon provider's control, electronic coupons cannot be prevented from being fraudulently printed and redeemed.

SUMMARY OF THE INVENTION

One embodiment of the invention relates to a method and system comprising a server and memory, where a location identifier is provided to a user, and where the location identifier points to a discount certificate webpage and contains a link identifier indicative of one or more discount certificates to be printed. The discount certificate webpage is presented to the user as well as the coupon to be printed, wherein the location identifier has appended thereto, at least a user identifier associated with the user. The user identifier is verified, and printing of the discount certificate is performed, where any predetermined security regarding the printing of the discount certificate is applied based on at least the user identifier appended to the location identifier.

Another embodiment of the invention relates to a method and system, where a first location identifier is provided to a user at a first webpage, the first location identifier pointing to a second webpage and including a link identifier indicative of a discount certificate to be printed. A token request is received, the token request comprising a second location identifier, wherein the second location identifier includes the link identifier and a code, and wherein the second location identifier has appended thereto, at least a user identifier associated with the user. The code is verified, and a token is generated in response to the token request. The time when the token was generated is determined, wherein the token is generated based upon the user identifier. The token is passed back to the first webpage, whereupon the token is appended to the first location identifier. A print request is then received for printing the discount certificate presented on the second webpage, the print request comprising the first location identifier with the appended token. The user identifier is verified and the print request is authorized only if the first location identifier has appended thereto, the same token that was generated in response to the token request, and the token has not expired relative to the time when the token was generated.

Yet another embodiment of the invention relates to a method and system, where a public location identifier to be provided to a user is generated. The public location identifier points to a dynamic discount certificate webpage presentable to the user, where the public location identifier includes a link identifier indicative of a discount certificate presented on the dynamic discount certificate webpage to be printed. The method and system further comprise printing the discount certificate presented on the dynamic discount certificate webpage.

These and other advantages and features of various embodiments, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the present invention are described by referring to the attached drawings, in which.

DETAILED DESCRIPTION OF VARIOUS EMBODIMENTS

Figure 1:
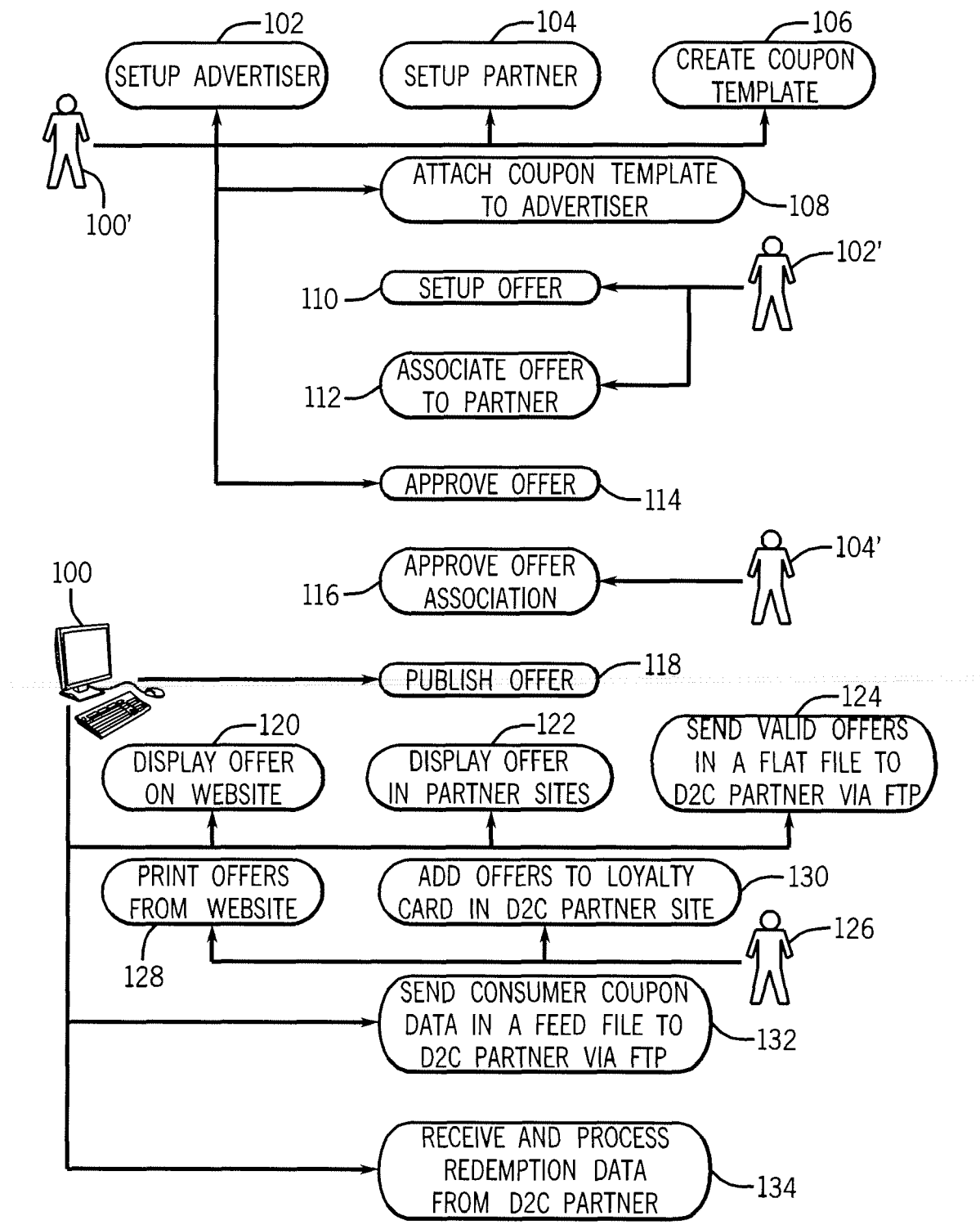
FIG. 1 is an exemplary process flow in the lifecycle of an electronic coupon.

Various embodiments provide for electronic discount certification (e.g., coupon) generation and secure distribution, and the prevention of fraudulent printing via a coupon system operated by a coupon distributor. FIG. 1 illustrates an exemplary process flow in the lifecycle of an electronic coupon. As described above, electronic coupons can be provided to a user (e.g., consumer) directly by an advertiser or even a product or service retailer. Alternatively, product or service providers, retailers, or marketers may collaborate with a coupon distributor that operates a coupon system to provide coupon generation and/or an online network or distribution channel for electronic coupons. With reference to FIG. 1, an administrator 100' of a coupon system 100 is shown as setting up an "advertiser" at 102, a "partner" at 104, and/or a coupon template at 106 to allow the advertiser 102' to include any relevant data or details regarding the coupon. That is, the administrator 100' obtains and enters relevant advertiser 102' and partner 104' information, and configures the coupon system 100 for use with the advertiser 102' and/or partner 104'. As utilized herein, the term "advertiser" may refer to a client (of or relative to the coupon distributor and coupon system) sponsoring offers, e.g., a marketing entity or consumer packaged goods company. A "partner" can refer to a client (of or relative to the coupon distributor and coupon system) such as, e.g., a network distribution partner of the coupon distributor that distribute products, e.g., General Mills™, Coca-Cola™, Procter & Gamble™ etc. It should be noted that advertisers and partners may also be considered to be users of the coupon system 100 (e.g., when the advertiser creates coupons using a coupon template, when the partner approves coupon association, etc. as described in greater detail below). It should also be understood that FIG. 1 illustrates single instances of the administrator, the coupon distributor, the advertiser, and the partner merely for simplicity. However, various embodiments contemplate the involvement of any number of, combination, or groups of these entities.

At 108, the administrator 100' associates or assigns the coupon template to the advertiser 102'. At 110, the advertiser 102' uses the coupon template associated with or assigned to the advertiser 102' and creates an offer while providing the relevant details associated with the coupon. At 112, the advertiser 102' associates the created offer with a partner 104'. At 114, the administrator 100 validates and approves the offers created by the advertiser 102', and at 116, the partner 104' verifies and approves any offers associated therewith.

At 118, the approved offers are published online. Examples of online publishing include, but are not limited to displaying the offer on a website (provided via the coupon system 100) at 120, displaying the offer at one or more partner websites at 122, and sending the offer to a "Direct-to-card" (D2C) partner in a feed file at 124 using, e.g., a file transfer protocol (ftp). A D2C partner can refer to a retailer or other entity that offers loyalty cards, where the coupon system 100 can send the offer or coupon directly to a retail loyalty card associated with a particular consumer.

From a consumer perspective, a consumer 126 may select one or more desired coupons for printing. That is, from either the coupon system website or a partner website, the consumer 126 may access one or more coupons and print them locally at a printer. Alternatively at 130 and in accordance with the D2C scenario, the consumer may select the one or more desired coupons to be added to his/her retail loyalty card. At 132, the coupon system 100 sends the consumer loyalty card number and the selected coupons data in a feed file to the D2C partner via FTP. Thereafter, at 134, the coupon system 100 receives and processes a redemption data feed file obtained from the D2C partner.

Figure 2:
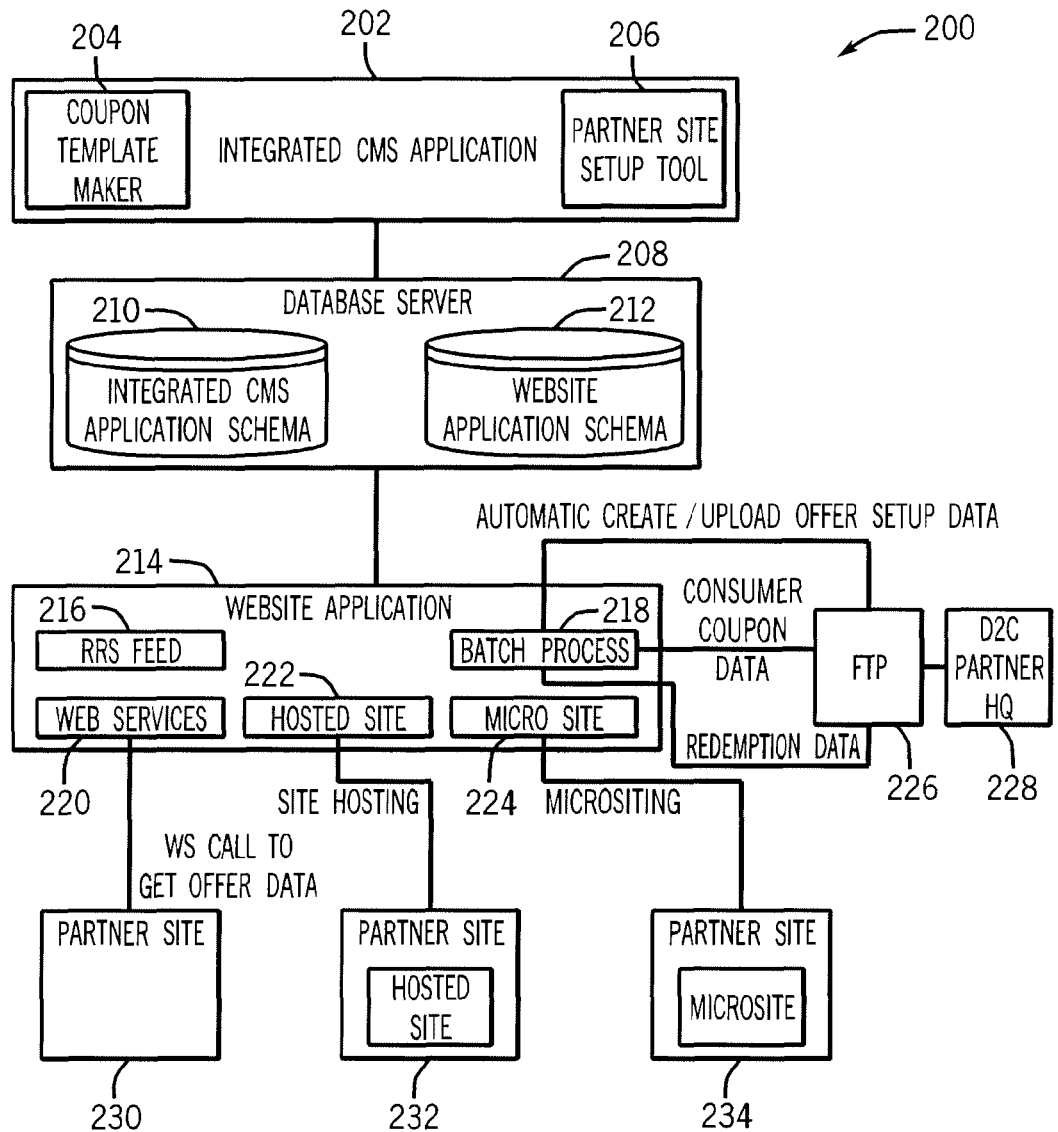
FIG. 2 illustrates an exemplary system architecture of a coupon system.

FIG. 2 illustrates an exemplary system architecture of a coupon system 200 (which would be operated and provided by, e.g., a coupon distributor) through which various embodiments may be implemented and effectuated. The coupon system 200 includes an "integrated content management system (CMS) application" 202. The integrated CMS application 202 can be used to: create coupon templates using an integrated coupon template maker tool 204; create and setup advertisers, partners, and offers as described above; and setup a partner's (that opt for site hosting) website using a partner site setup tool 206.

The coupon system 200 further includes a database server 208 that is common to the integrated CMS application 202 and the coupon system website. It should be noted that the coupon system website is effectuated by a "website application" 214 for performing the requisite processes described in greater detail below. Additionally, it should be noted that both the integrated CMS application 202 and the website application 214 can have their own independent schemas 210 and 212, respectively. That is, offer setup data flows into both the schemas 210 and 212 from the integrated CMS application 202, and is used by the website application 214 for display and integration with partner sites.

The website application 214 provides a "public-facing" website that hosts one or more webpages containing electronic coupons for display and printing by consumers. The website application 214 fetches electronic coupons from the common database server 208 between the website application 214 and the integrated CMS application 202 and displays the electronic coupons. Thus, a consumer may visit the coupon system website and browse or access one or more desired offers, and print coupons for the desired offers. The website application 214 also provides options for integration with partners. Further still, the website application 214 hosts, e.g., a Real Simple Syndication (RSS) feed 216 which is open to the public, allowing consumers to subscribe to the RSS feed 216 to receive electronic coupon data on a frequently updated basis. It should be noted that other types of web syndication or data aggregator technology may be utilized in accordance with various embodiments.

As described above, various embodiments provide the ability for a coupon distributor to send an offer or coupon directly to a retail loyalty card associated with a particular consumer via D2C partner integration. The D2C partner integration is done using a batch process component 218 hosted in a server that hosts the coupon system website, where the batch process component 218 periodically creates a flat/feed file containing the offer setup data. The file is transmitted to an ftp server 226 to be picked up by the D2C partner headquarters (HQ) 228. The batch process component 218 also creates and transmits consumer coupon data to the D2C partners, as well as imports and processes the redemption data feed file from the D2C partners transmitted via the ftp server 226.

Partner sites, such as partner sites 230, 232, and 234 illustrated in FIG. 2, are integrated with the website application 214 using various methods. In accordance with a first method, the website application 214 exposes one or more web services 220 that provide the coupon data for a particular partner. The partner can consume the web services 220 by giving out their partner ID to get coupon details. Additionally, the partner, if they so desire, can apply their own rendering logic to display the coupon on their own partner site 230.

In accordance with another method, partner site integration involves presenting the coupon system website as a "microsite" 224 on the partner site 234. For example, the partner may include an iframe inside their own partner site/website 234, where the source will point to the coupon system website that hosts/displays the coupon data.

Further still, a method of site hosting may be utilized to effectuate partner site integration. In accordance with this method, partner site integration begins with partner site setup in the integrated CMS application 202 as described above. Once a partner site 232 is setup in the integrated CMS application, the website application 214, via a hosted site module 222, retrieves the data to display coupon data on a webpage whose look and feel will be the same as that of the partner site 232. It should be noted that this entire webpage can be hosted by one or more servers hosting the coupon system website, or alternatively, dedicated web servers.

Figure 3:
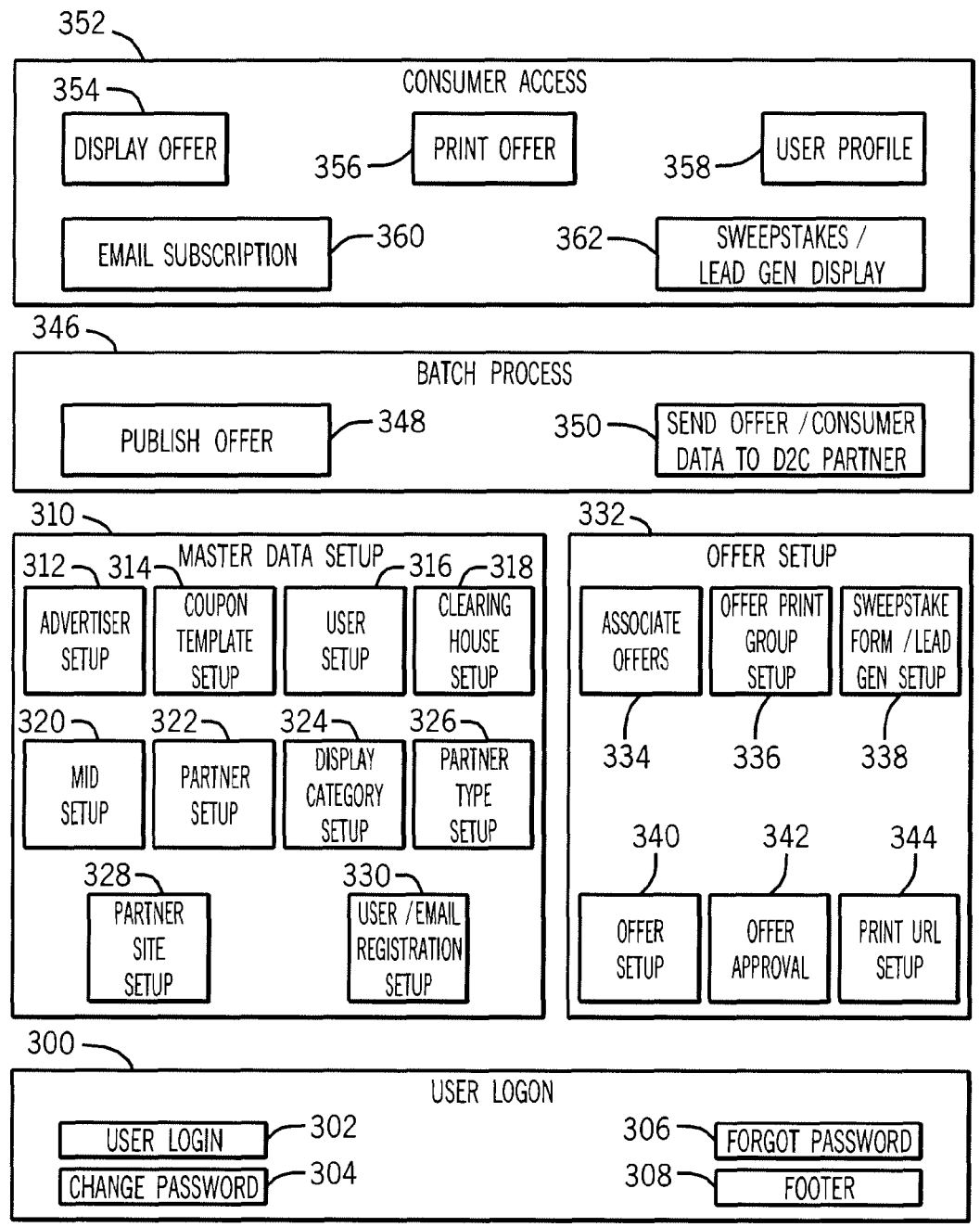
FIG. 3 illustrates the functional architecture of the coupon system of FIG. 2.

FIG. 3 illustrates the functional architecture of the coupon system described above. From a functionality perspective, a User Logon module 300, a Master Data Setup module 310, and an Offer Setup module 332 make up the integrated CMS application. A Batch Process module 346 and a Consumer Access module 352 make up the website application. It should be noted that more or less modules may be implemented within or as part of the integrated CMS application and/or website application while providing substantially similar functionality. For example, one of the aforementioned modules may be implemented in another entity of the system 200 described above. It should be further noted that each of these modules may include one or more respective user interfaces (UIs), such as, e.g., web-based graphical UIs (GUIs), and associated processes for accomplishing the various module tasks or providing user access for inputting the requisite information needed to accomplish the various module tasks.

The User Logon module 300 is configured to handle various aspects of user access and identification. For example, the User Logon module 300 controls user login processes 302, change password 304 and forgotten password 306 functionalities, as well as a footer 308 functionality in the integrated CMS application. It should be noted that all users of the integrated CMS system including, e.g., any administrators, advertisers, and/or partners, may access these features for their respective purposes, e.g., providing consumer access requirements/data for accessing a partner site or the coupon system website, etc.

The Master Data Setup module 310 deals with any master data setup-related functionalities. Such functionalities include, but are not limited to, the following: advertiser setup 312 (e.g., loading advertiser information into the coupon system); coupon template setup 314 (e.g., setting up coupon template layouts, offer information to be rendered, etc.); user setup 316 (e.g., setting up username and password for authorization, creating privileges and roles, assigning roles to users, etc.); clearinghouse setup 318 (e.g., maintaining an agency/company responsible for settling trading accounts, collecting and maintaining marginal monies, bringing together seekers and providers of goods, etc.); member identifier (MID) setup 320 (e.g., setting up a client's unique identifier for each member/registered consumer); partner setup 322 (e.g., setting up one or more partners, e.g., retailers or network distribution partners); display category setup 324 (setting up display categories or product types that are specified when an offer is setup, for filtering or grouping offers for consumers); partner type setup 326 (e.g., setting up partners based on whether the partner is, e.g., a "registration required" partner); partner site setup 328 (e.g., setting up micrositing information such as whether or not a microsite will contain iframes, other visual attributes, etc.); and user/email registration setup 330 (e.g., setting up a user registration process for the required registration type). All of these features are functionally a part of the integrated CMS application and can be accessed by an administrator.

The Offer Setup module 332 is configured to group certain functionalities, including but not limited to, the following: associating offers 334 (e.g., associating offers or disassociating offers with partner sites); offer print group setup 336 (e.g., setting effective coupon dates, setting offer group print limits, etc.); sweepstake form/lead generation setup 338, offer setup 340 (e.g., setting up offers specifying a type of offer provided and other related information); offer approval 342 (setting up the ability for partners to approve advertiser-submitted/created offers); and print URL setup 344 (generating print URLs associated with offers promoted by, e.g., a partner at a partner site, setting print limits, etc.) With regard to the aforementioned sweepstake form/lead generation setup 338, it should be noted that the coupon system may be used not only for coupon generation and distribution, but for sweepstakes purposes as well. That is, forms may be created and used for sweepstake and lead generation, where when a consumer clicks on a link to a sweepstake/lead generation form, the consumer information entered into the form is recorded an passed on to the client holding the sweepstake promotion. The Offer Setup module 332 is also a part of the integrated CMS application and is primarily accessed by advertisers.

Before an offer is set up, a Letter of Commitment (LOC) should be created. The LOC is specific to a single advertiser, although multiple offer programs can exist for one or more brands of an advertiser in a single LOC, and the LOC can be associated with D2C or printable coupon distribution. Moreover, a single LOC can cater to multiple timelines and multiple distribution channels. There are different types of LOCs including, for example: a time-based LOC, where an offer is valid only for a contracted time period; a print-based LOC, where an offer is valid only until a predetermined print limit is reached; and a partnership-based LOC, which is similar to the print-based LOC, but also includes a "new coupon alert spotlight," a "solo page," and a "web link." Additional LOC types include a coupon tech LOC which refers to a contract between the coupon distributor and an advertiser, where the advertiser purchases, e.g., a print URL. It should be noted that in certain instances, a print URL may be considered to be an advertiser function, and hence the advertiser may be setup as a partner. Yet another LOC type includes an account-specific LOC used for coupon programs distributed at a limited number of retail network sites instead of on the coupon distributor network/network channels.

It should be further noted that a LOC may only be created by, e.g., an administrator of the coupon distributor, and once the requisite information is submitted regarding the LOC, the LOC can be generated in a pdf format or Word format. Thereafter, the LOC is sent to the advertiser and to a finance division of the coupon distributor for approval. Various change rules and fees can be applied to LOC creation as appropriate. Additionally, brand category exclusivity can be applied to LOCs and are valid for specific time period.

The Batch Process module 346 is a part of the website application and handles offer/coupon publishing 348 and sending offer/coupon and consumer data to D2C partner 350, which occurs in as a background process(es) without any direct/human user interaction. For example, a plurality of offers/coupons may be collected into a set or "batch" and processed together for publication on, e.g., a partner site. Moreover, sending consumer data to the D2C partner functionality involves the previously described D2C partner integration, where the consumer data (e.g., retailer loyalty card number and any attached coupons) are written into a flat file and transmitted to the D2C partner via ftp, or some other appropriate file transfer method or protocol.

The Consumer Access module 352, like the Batch Process module 346, is part of the website application and contains features which are available to consumers through the coupon system website. Such features, which are available to the public, include, but are not limited to, offer/coupon display 354, offer/coupon print 356, user profile management 358, email subscription 360, and sweepstake/lead generation display 362.

Figure 4:
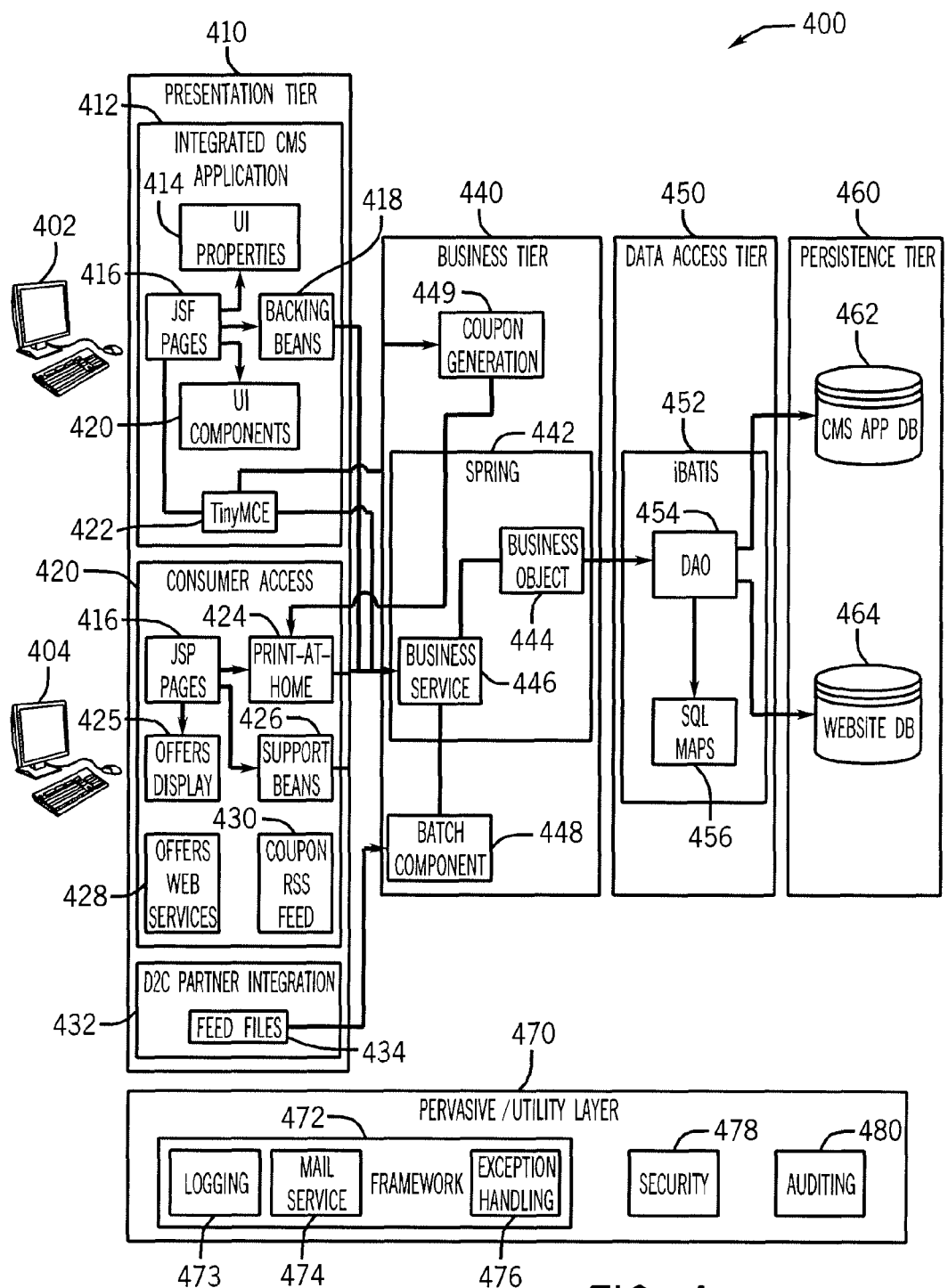
FIG. 4 illustrates the application architecture of the coupon system of FIG. 2.

FIG. 4 is a diagram illustrating the application architecture of a coupon system 400. The application architecture is described in terms of "tiers" and the components within each tier. As shown in FIG. 4, the coupon system 400 includes a Presentation tier 410, a Business tier 440, a Data Access tier 450, a Persistence tier 460, and a Pervasive/Utility tier 470.

The Presentation tier 410 includes the integrated CMS application 412, a consumer access component 420, and a D2C partner integration component 432. The integrated CMS application 412 of the Presentation tier 410 utilizes JavaServer Faces (JSF) pages 416, a Java-based web application user interface (UI) development framework, to implement UI properties 414, backing beans 418 (for defining UI components/methods that perform UI component functions), and UI components 420. JSF differs from some other Model-View-Controller (MVC) frameworks in that JSF is a component-oriented and event-driven framework. JSF includes, among other features: a set of application programming interfaces (APIs) for displaying user GUI components and managing their state, handling events and input validation, page navigation using Extensible Markup Language (XML), etc.; tag libraries to access JSF components; predefined/default UI components; and server-side event handling. Additionally, the coupon system 400 utilizes MyFaces and RichFaces implementations of the JSF specifications. MyFaces is a particular JSF implementation promulgated by the Apache Software Foundation. RichFaces refers to a component library for JSF built on the Ajax framework, and includes Ajax components. Furthermore, the coupon system 400 utilizes various "custom" JSF components apart from the standard JSF components. It should be noted that other frameworks or development platforms may be utilized in accordance with various embodiments.

Moreover, the integrated CMS application 412 includes a "TinyMCE" tool to create coupon templates. TinyMCE is a JavaScript-based tool that provides rich text editing capabilities and allows saving a template in HTML format. This enables seamless integration of the coupon templates with the offer setup process. Custom visual as well as non-visual components may be created using the TinyMCE API to implement system-specific functionalities for the coupon template design process. For example, users such as advertisers may require the ability to add an image to a coupon template, resize it, and/or place the image in any position within the coupon template.

The Consumer Access component 420 of the Presentation tier 410 also utilizes JSF pages 416 to implement a print-at-home feature 424 and support beans 426. Additionally, the Consumer Access component 420 includes an offers web services feature 428, where the coupon system provides an integration option for partners through web services as described above. For example, the coupon system exposes a web service which provides coupon information for specific partners requesting it. The web service is hosted at the website application server and any end-point information may be given to those partners wishing to consume it. The partners use web services description language (WSDL) generated to consume the web service and provide their details in the request. Any coupons published for the partner are returned in a response to the partner request which is then rendered at the partner site using their own rendering logic.

A coupon RSS feed feature 430 is also provided in the Consumer Access component 420. Coupon data that will be available at the coupon system website may also be published as an RSS feed for consumers. Consumers may subscribe to this RSS feed and use a viewer tool to view coupon information at, e.g., their personal computer. This enables consumers to get updates regarding coupon information automatically at a computer without logging into the coupon system website.

The print-at-home component 424 that allows electronic coupons to be printed by a consumer may be embedded in the JSP and implemented using, e.g., an ActiveX and Java Applet client for MS Windows and Apple Mac-based clients, respectively. Such client components are preferably lightweight and can be used to get device IDs, e.g., the MAC address, of a client machine. Obtaining a device ID allows the coupon system to effectuate sending the coupon to a printer to be printed. Additionally, capturing the MAC address allows the coupon system, for example, to verify actual printing of a coupon. That is, the system can verify whether or not a print request/job is being sent to an actual printer/device rather than just some sort of data capture, such as a "print to file" request. Actual coupon generation will happen on the website server side using Hypertext Markup Language (HTML) to Portable Document Format (PDF) transformation. The generated PDF is sent to the client for printing using embedded JavaScript. Additionally, JSP pages 416 will also be utilized to implement the offer display component 425 for displaying offers/coupons on, e.g., the third-party coupon distributor website.

Further still, the Presentation tier 410 includes a D2C partner integration component 432, which as described above, involves writing consumer data (e.g., retailer loyalty card number and any attached coupons) into a flat file and transmitting it to the D2C partner via ftp.

The Business tier 440 follows a Service Oriented Architecture (SOA) pattern. That is, all business logic is accessible through a set of services. These services are entry points to the business logic layer and to access any business components.

Spring 442 is a flexible framework for the Java platform with convenient features including at least the following: flexible bean management; aspect-oriented programming (AOP) support; web MVC framework; integration with other frameworks' scheduling support, email utility; Java EE Connector Architecture (JCA) support, Java Management Extensions (JMX) support; Java Message Service (JMS) support; web services; Object Relational (O/R) tool integration; and declarative transaction management. Spring 442 also provides a high-degree of abstraction and uses inversion of control resulting in increased decoupling, configurability, and management. Spring 442 is used for managing the backing bean, business service 446, business objects 444, EJBProxy (not shown) and data access objects (DAO) 454. Spring components such as the following are utilized: "Spring Core" for implementing Dependency Injection and managing bean lifecycle of business services and business objects; "Spring Object Relational Mapping (ORM)" for providing a template for the iBATIS persistence framework; "Spring AOP" for declarative transaction management; and "Spring AOP" for Message Driven Bean (MDB).

Business service component 446 follows an "Application Service" pattern and is an entry point for any business-related operation. Again, it follows the standard (SOA) pattern, and uses the required business objects 444 and if necessary, calls a transaction manager to mark a transaction boundary in order to provide a service to the Presentation tier 410. The business object component 444 holds the business logic. If the business logic involves, e.g., database access, the business logic invokes appropriate DAOs of the Integration Tier to perform various database operations involved in accomplishing the functionality.

The Business tier 440 further includes a batch component 448 which receives any feed files 434 from the D2C partner integration component 432 using ftp. That is, information, such as offer data, coupons selected by a consumer, etc. are sent to the batch component 448 for batch processing as described above, and redemption information from partners may be received from partners. Offer publishing (as also described above) is yet another function that can be implemented as a batch process which will be triggered using, e.g., a CRON job scheduler utility.

In terms of transaction management, Spring's declarative transaction will be utilized. That is, a business service component 446 may initiate some transaction and the transaction context will automatically propagate to the business objects 444 by the transaction manager component of Spring. The business services component 446 may also be responsible for the overall management of transactions by starting, committing and marking the boundary of the transactions based upon, e.g., client requests, and providing necessary transactional contexts to all business objects 444.

As described above, the TinyCME tool 422 is used to create coupon templates. An actual coupon may then be generated using a coupon generation component 449 from an existing coupon template. Any associated offer details are fed into a selected coupon template and a new HTML coupon file is generated, which may then be printed, via, e.g., the print-at-home function 424. The Coupon HTML file is converted to XML using an HTML Tidy tool, which in turn is converted to a Transform Formatting object (XMLFO) using, e.g., XML transformer, or some similar document/file transforming tool. From the Formatting object and standard Extensible Stylesheet Language (XSL), a PDF file is generated and saved in the website server. An Acrobat script embedded in the PDF using iText enables PDF document printing in silent mode.

The Data Access tier 450 is used as the integration junction of the integrated CMS application 412 and the coupon system website/website application with the data tier. DAOs 454 are deployed in this tier, where DAO classes generally relate to specific business functionality and integrate the business tier with data tier. The Data Access tier 450 also aids in connecting relational database management systems (RDBMS) using a standard Java Database Connectivity (JDBC) API or an ORM tool to keep the Business tier 440 isolated from any underlying persistence mechanism. iBATIS 452 refers to a Data Mapper Framework, that in contrast to the traditional JDBC approach that constitutes many operations other than writing Standard Query Language (SQL) queries, reduces the amount of requisite Java code. That is, the iBATIS SQLMap framework significantly reduces the amount of Java code normally needed to access a relational database. Moreover, iBATIS effectively eliminates the mixing of Java code with SQL Code. DAO classes may extend and use base custom DAO classes provided by the third-party coupon distributor.

A Persistence tier 460 represents one or more databases and their constituents. In the example application architecture illustrated in FIG. 4, two data stores are shown as being utilized. A first database 462 is utilized for maintaining any integrated CMS application data. A second database 464 is utilized to store data from the coupon system website. The integrated CMS application 412 may be responsible for pushing data from its own database 462 to the second database 464. For example, once an offer is verified, the offer is pushed to the coupon system website database 464. The Data Access tier 450 uses JDBC to connect to the database 464 and iBATIS 452 uses the JDBC connection to perform various SQL operations to achieve data persistence.

A Pervasive/Utility layer 470 is also part of the application architecture 400. A framework 472 includes a Logging component 473, a Mail Service component 474, and an Exception Handling component 476. The Logging component 472 internally uses log 4j for tracking the exceptions/errors in the system. It should be noted that other logging utilities may be utilized other than the Java-based log 4j. Logging is provided as a default for all critical errors, and logging levels may be made configurable as needed. With log 4j, it is possible to enable logging at runtime without modifying the application binary, where statements can remain in shipped code without incurring a heavy performance cost. Further still, logging behavior can be controlled by editing a configuration file, without touching the application binary.

The Mail Service component 474 is a wrapper over the Java Mail API used to send/receive mail. The coupon system utilizes this API to send system-generated email notifications to, e.g., an administrator or consumer. Exception handling component 476 defines different types of exceptions relevant to each application tier. Various exceptions defined in the Framework 472 include, but are not limited to, DAO Exception, Business Exception, and Presentation Exception. Every layer/tier catches any potential run-time exceptions and converts them into layer-specific exceptions, where all exceptions may be logged with an easy to customize declarative mechanism. Meaningful error messages can be generated for display to a user such as an administrator or advertiser.

With regard to security, illustrated as a Security component 478, various embodiments utilize a "user to role" mapping mechanism. The role performs certain functionalities and users pertaining to the role will inherit all the behaviors of a particular role. Security with respect to the integrated CMS application involves a two-level authentication mechanism due to its use by internal and external users. That is, active directory authentication is provided for internal users, such as administrators of the coupon system, and database driven authentication is provided for external users, such as partners or advertisers. It should be noted that the active directory and/or the authentication database for external users may be configured as, e.g., one or more data repositories, that are separate from but accessible by or from the coupon system.

The Pervasive/Utility layer 470 may further include an Auditing component 480. Auditing can allow for maintaining an audit trail or a journaling function for, e.g., required database tables. Data administrators or database users can query a journal (history) table to measure changes, if any, that may have occurred over some particular period of time for a particular database table.

Figure 5:
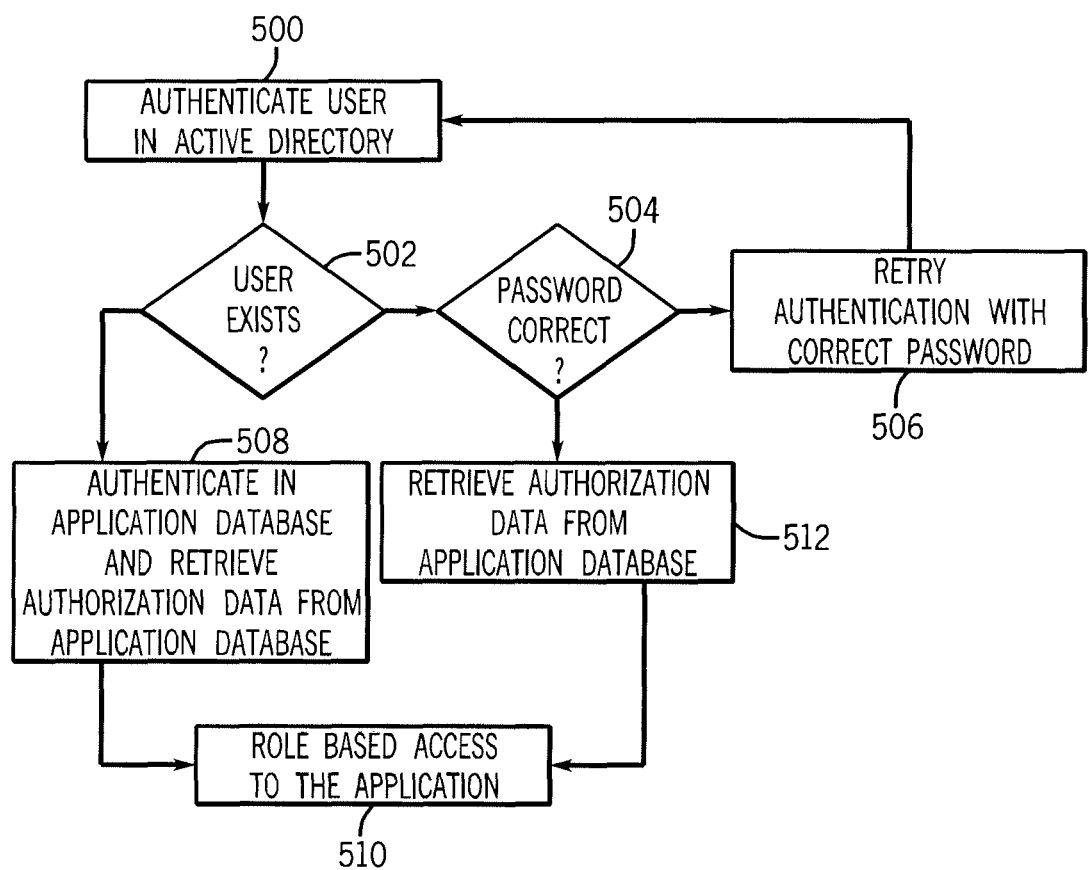
FIG. 5 illustrates an exemplary authentication process for authenticating a user accessing an integrated content management system application of the coupon system of FIG. 2.

FIG. 5 illustrates the security authentication process, where a user (internal or external) is authenticated in the active directory at 500. At 502, it is determined whether the user exists. If the user does not exist in the active directly, the user is presumably an external user. Authentication is performed in the application database and authorization data is retrieved from the application database at 508. At 510, role-based access, as described above, is provided to the integrated CMS application for the external user. If it is determined at 502 that the user does exist in the active directory, the user is presumably an internal user. At 504, it is determined whether a password entered by the user is correct. If the password is not correct, authentication is retried at 506 with the correct password and returns to authentication of the user in the active directory at 500. If the password is deemed to be correct at 504, authorization data is retrieved from the application database at 512. Again, the appropriate role-based access is provided to the integrated CMS application at 510. It should be noted that active directory authentication may be implemented using, e.g., a Lightweight Directory Access Protocol (LDAP), authentication provider. Database driven authentication may be implemented using an appropriate user id/password authentication procedure.

Once a user's identity has been confirmed, the coupon system retrieves the accessible resources for the logged-in user based on Role Based Access Control (RBAC) from the database. Authorization is implemented using, e.g., URL-based web security and programmatic security. URL-based web security is performed by the website application server and is defined in web configuration files, where a virtual path is defined for each user group. Each virtual path is mapped to a security role, which is mapped to one or more groups. For example, a "/collections/" path is defined for the collection department of the third-party coupon generator/distributor, while a "/sales/" path is defined for sales users. Programmatic Security operates as follows. If a particular screen, such as a setup screen, is shared across multiple roles, e.g., one role is used to create an option and another role is used to approve it, the programmatic security framework will display an approve button only for its corresponding role. This is accomplished by associating the visibility and editability properties of the JSF components with the appropriate user privileges.

Security with regard to consumer access at the coupons system website will be made to be Secure Sockets Layer (SSL)-enabled by signing the coupon system website server with, e.g., an RSA-signed certificate from any trusted Certificate Authority (CA), e.g., VeriSign®, Thawte™, Comodo™, etc., although other security methods may be utilized. The coupons system website may also be configured not to accept any request on any non-secure ports to ensure that all communications to and from the website are secure. Enabling SSL ensures data security as it provides data encryption. Because the coupons system website is a publicly-accessible website available for consumers to access and print coupons pertaining to various offers, consumers need not necessarily register themselves to access/print coupons. Hence, no authentication is needed for consumers.

However, certain partners may require registration and for whom registration data is captured in coupon system. For such partners, a database authentication process is provided which will authenticate users (i.e., partners) using a user id and password captured during the registration process. Given that all users from a consumer access perspective are considered to be external users, there is no active directory authentication. Additionally, authorization is not needed for accessing the public-facing coupon system website.

Web services are secured using authentication, data-encryption and non-repudiation. With regard to authentication, web service clients will need to provide a user id and password for authentication in order to invoke a desired web service, such as provides coupon information for specific partners. A Servlet Filter is used to capture and intercept a request for the described web service, and initiate the authentication process. This filter may be configured with AxisServlet which handles all Simple Object Access Protocol (SOAP) requests. Additionally, the Servlet Filter will communicate with an authentication module to complete the authentication process. It should be noted that the authentication module implemented within the integrated CMS application can be reused for this purpose. User credentials will be sent from a client via an HTTP request. Data encryption and non-repudiation will be implemented using a Transport Layer Security mechanism configured by enabling SSL in the transport layer and installing an RSA signed certificate for the communication. There is no specific need for implementing authorization for accessing data via RSS feeds.

As indicated above, authorization is unnecessary for accessing data via RSS feeds. However, any coupon data published through RSS feeds will be secured by using SSL encryption. RSS Feeds are published via the coupon system website only, where the coupon system website will allow communication only through HTTPS. Thus, any RSS feeds will automatically be secured by the same secure channel. There is no specific need for implementing authentication or authorization for accessing coupon data via the RSS feeds.

Figure 6:
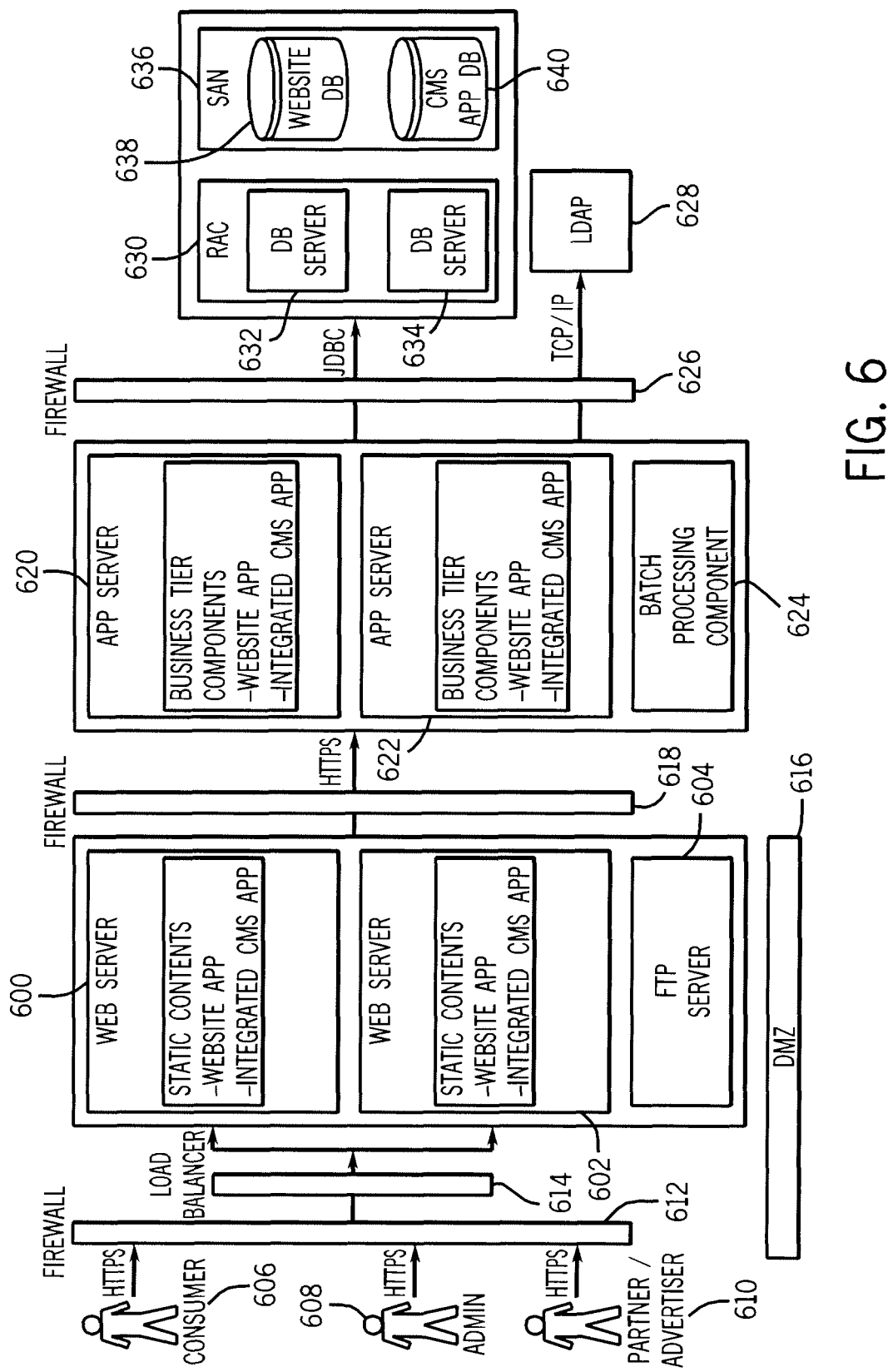
FIG. 6 illustrates an exemplary implementation of the coupon system of FIG. 2 in a distributed environment.

FIG. 6 illustrates the coupon system implementation in a distributed environment. Distribution of the coupon system components is relative to the aforementioned architectural tiers of the coupon system. Web servers 600 and 602 upon which the website application is implemented can be Apache HTTP Servers or some other server capable of accepting and service HTTP requests and responses, respectively. SSL is enabled in each of the web servers 600 and 602 to enforce all communication from users using HTTPS. It should be further noted that although two web servers are described herein, any number of web servers may be utilized in the coupon system. The web servers 600 and 602 also contain static files, such as HTML, JavaScript, CSS, images, and any other static content of a web page. Consumers 606 and partners/advertisers 610 communicate with the web servers 600 and 602 via the Internet. Administrator users 608 may communicate with the web servers 600 and 602 via the Internet as well, e.g., from within an intranet of the third-party coupon generator/distributor. All requests to the web servers 600 and 602 are routed via a firewall 612 for security. Partners 610 may also connect to one or more ftp servers 604 for downloading D2C integration data as described previously.

As further illustrated in FIG. 6, multiple application servers 620 and 622 are deployed in the application tier, and it should be noted that any number of application servers may be deployed in the coupon system in accordance with various embodiments. Such web servers may be implemented using, e.g., Oracle WebLogic Application Server 10.0 hosted in a Solaris environment. Clustering the application servers 620 and 622 provide a way to achieve load balancing and failover. However if server clustering, e.g., Oracle Weblogic Server clustering, is not feasible, a pseudo-clustered environment can be utilized by using a hardware-based load balancer 614. The load balancer 614 may be configured to be an entry point to the website application, where the load balancer 614 acts to balance the load across all web servers, e.g., web servers 600 and 602. Additionally, application servers 620 and 622 provide business tier components related to the integrated CMS application and the website application. Moreover, another firewall 618 may be implemented between the web servers 600 and 602 and the application servers 620 and 622. That is, all the requests from the web tier will be routed via the firewall 618, where the firewall 618 is configured to allow communication from the internal IP addresses of the web servers 600 and 602 and the ftp server 604 only. Application servers 620 and 622 can communicate with the database tier using JDBC connections which in turn will use an underlying Transmission Control Protocol/Internet Protocol (TCP/IP). Communications to an LDAP Server 628 are effectuated using an LDAP-specific custom protocol over TCP/IP protocol through a firewall 626.

It should be noted that the aforementioned web servers 600 and 602 and application servers 620 and 622 can refer to a physical hardware apparatus, such as a computer or processor upon which software for performing such processes is stored and executed. Alternatively, such servers may refer to the software itself, which by its nature requires some physical hardware apparatus for execution thereof. It should be further noted that the web servers 600 and 602 and the application servers 620 and 622 may be implemented in co-located servers or a single hardware apparatus/server.

Again, batch processing is performed via a batch processing component 624 implemented in the Solaris environment. Any job scheduling will be performed using the Solaris CRON utility discussed previously. Batch jobs will communicate with the database tier using JDBC over TCP/IP protocol.

The database tier, as illustrated in FIG. 6, shows two database servers 632 and 634, and the website database 638 and the integrated CMS application database 640. The databases servers 632 and 634 may be implemented using Oracle Database servers that are load balanced using an Oracle Real Application Clusters (RAC) environment 630. The application tier components communicate with the RAC 630 for connecting to one or more of the requisite databases instead of connecting to any specific server within the RAC 630. This substantially ensures failover management and proper load balancing by the RAC 630. Data is stored in an Oracle storage area network (SAN) 636. In accordance with one embodiment, only one copy of any data is maintained in the SAN 636, so that all of the database servers 632 and 634 within the RAC 630 share the same copy to the data. Alternatively, other data storage redundancy schemes may be used if desired. Again, more or less database servers and/or databases may be utilized to accommodate a desired amount of data to be stored.

As described above, the coupon system in accordance with various embodiments may provide for coupon distribution in the form of online printable coupons placed on a partner's microsite or dynamic coupon page, direct access, downloading, and printing via the coupon system website, or utilizing the D2C feature, where an offer can be linked to a loyalty card. Alternatively still and in accordance with yet another embodiment, the coupon system may provide offers in the form of, e.g., stand-alone print URLs. That is, instead of converting electronic coupons represented by HTML/visual representations into PDF documents for printing at home or some local printer, the offers are distributed as actual URLS or "links" on a partner website, or via e-mail, or otherwise indicated, as for example, through banner placements on one or more websites (whether partner-related, coupon system-related, or third-party-related), etc. It should be noted that each offer may be set up for distribution from more than one of these locations. Upon selection of the offer, one or more electronic coupons associated with the offer can be printed.

If offers are distributed via a partner microsite, a print URL is created to access the appropriate coupon page (i.e., microsite) hosted by the coupon system website, where one or more coupons associated with the offer may be displayed. The print URL may be provided on a partner's own website, which a consumer may click or select, bringing the consumer to the partner microsite hosted on the coupon system website. Alternatively, the print URL may be provided to a consumer via email or banner placement on one or more websites (whether partner-related, coupon system-related, or third-party-related), or placement in some other type or form of communication or advertising/marketing vehicle. Again, the print URL provides information to the coupon system regarding what page to display on the coupon system website and, e.g., a particular coupon associated with the offer. The consumer may then click on, e.g., the displayed coupon or pop-up button or similar mechanism associated with the particular coupon, to initiate printing.

In accordance with one embodiment, registration may be required of the consumer, where a MID associated with the particular consumer that requested printing of the electronic coupon is appended to the print URL and sent to the coupon system for verification/validation. Alternatively and in accordance with another embodiment, no registration may be required in which case, printing is performed without any authentication. Moreover, the print URL may provide in addition to a MID, information used to customize the printed electronic coupon, as well as information used to track where the consumer accessed the print URL, e.g., a partner site, a banner on the coupon system website or another website, etc. More than one print URL may be created to access the partner microsite should the partner desire to track, e.g., advertising and/or marketing performance from more than one access point. For example, a partner may have a parent company website and specific brand websites, where print URLs to a particular discount offer or coupon can be provided on both websites.

Print URLs may vary depending on distribution points, tracking goals, and other coupon program elements. Exemplary print URLS or links provided below indicate the possibility to include nearly any parameter, information, or data that is meaningful to the advertiser, product or service provider, or partner. It should be noted that such information or data may be meaningful to the advertiser, product or service provider, or partner, but not necessarily meaningful to the coupon distributor or coupon system. In fact, the coupon system need not necessarily even understand this data or information included in the print URL. This ability to include meaningful information in the print URL is achieved through the use of the MID. As discussed above, a MID refers to a member identifier that uniquely identifies a user, consumer, or other entity that has registered at, e.g., a partner site. Alternatively and in accordance with various embodiments, the MID may be assigned to some user or entity registered with the coupon distributor directly or registered with the coupon distributor in addition to the partner site. Hence, such embodiments may be implemented in a couponing environment including only a user and the coupon distributor, without involving or including a partner/partner site. Preferably, the MID is assigned at the point of consumer registration, based, for example, on an algorithm that randomly generates a fixed-length string of characters. For example, a unique series of numbers, letters, or a combination of both may be used, although any appropriate identifier that results in uniquely identifying a consumer that may be sent with/appended to a URL may be used. For example, the MID may simply be appended to a URL or included in, e.g., a hidden form field, or indicated in or with the URL by some associative mechanism.

The MID serves a plurality of purposes. First, the MID provides security by preventing the consumer associated with the MID from printing the electronic coupon more than the allotted numbers of times. For example, high value coupons often have a pre-determined number of redemption opportunities per consumer. Use of the MID allows for such security measures to be achieved. Second, the MID enables the coupon system, advertiser, and/or partner to determine if a consumer has actually printed the coupon. Third and as described below, the MID data can be joined with redemption data to determine if the consumer that printed the coupon actually purchased the product or service associated with the coupon.

The following are examples of print URLs/links that contain a MID along with coupon information that is meaningful to the advertiser, partner, or product or service provider.

---

Client Hosts Registration, Consumer-level Tracking, Print Consumer Last Name
http://coupons.coupon_system_website.com/web/index.aspx?Link=aaa&MID=xxx&cf1=xxx
Client Hosts Registration, Consumer-level Tracking, Print Consumer Last Name, Track Consumer Entry Point
http://coupons.coupon_system_website.com/web/index.aspx?Link=aaa&MID=xxx&r=xxx&l=xxx&bn=xxx&cf1=xxx
Client Hosts Registration, Consumer-level Tracking, Print Consumer Last Name, Check aaa Offer, Track Consumer Entry Point
http://coupons.coupon_system_website.com/web/index.aspx?Link=aaa&MID=xxx&r=xxx&l=xxx&bn=xxx&check=aaa&cf1=xxx

---

Table 1 below provides exemplary parameters that may be populated with coupon or coupon-related information and appended to a print URL. In practice, other than the MID and "Link" parameters, the coupon information supplied via these parameters falls under the discretion of the product or service provider, advertiser, and/or partner. That is, the parameters described below, other than "Link" and "MID," are customizable and/or useable by the client (e.g., partner, advertiser, service provider, etc.) to include/identify any coupon information that the client desires. That is, although a parameter "r" as described in Table 1 is described as referring to a Refcode, the client is free to utilize the parameter "r" to mean some other desired information/identity. Moreover, additional parameters/parameter identifiers may be utilized in accordance with various embodiments.

indicative of e.g., a particular coupon, associated with the offer presented in the print URL. The variables indicated by "xxx" are populated by the partner and are representative of the MID and any of the aforementioned meaningful information or data. It should be noted that some variables may be populated dynamically with unique information for each consumer who clicks the print URL, while other variables may be static and associated with all consumers.

Any data passed by the partner to the coupon system via a print URL may be captured by the coupon system and returned to the partner via an assigned ftp location. For allowed prints, this "parameter recovery" involves utilizing an identifier, such as a PIN included in the data returned to the partner that is generated by the coupon system. The PIN enables the partner to join print data to any redemption data received by the partner.

Figure 7:
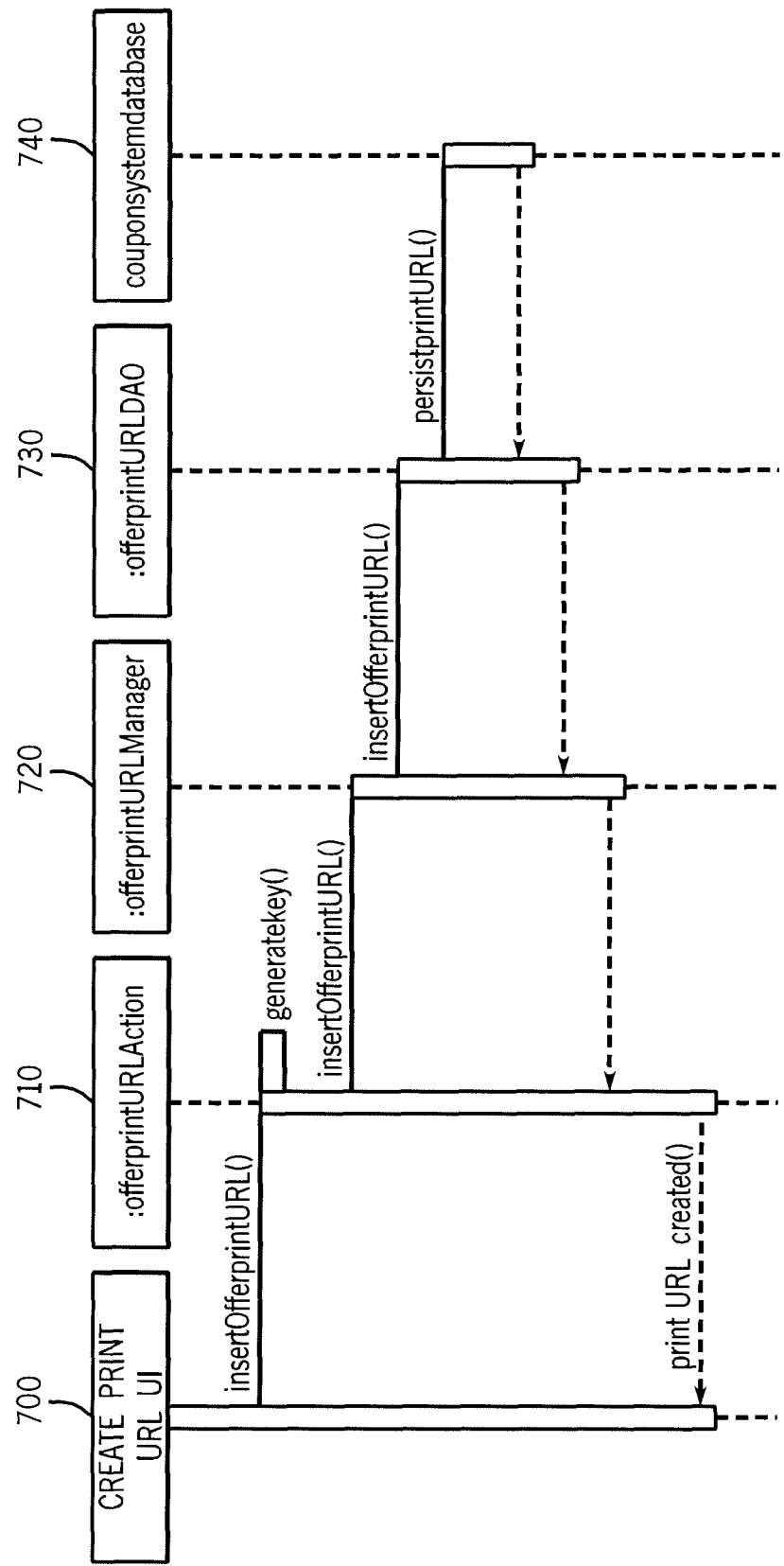
FIG. 7 is a sequence diagram illustrating various processes performed to create a print link.

FIG. 7 is a sequence diagram illustrating various processes performed to create a print link at the integrate CMS application. At 700, a print URL UI object is created, where an insertOfferprintURL( ) message is sent to an :offerprintURLAction object 710. A code or key is generated by

TABLE 1

| Name | Description | Length | Provided by |
|---|---|---|---|
| Link | Link Identifier - coupon system internal identifier which indicates which coupon(s) to print. This is an encrypted string. Required for all URLs. | N/A | Coupon system |
| MID | Member Identifier - A client's (e.g., partner's) unique identifier for each of their members. Required if the client hosts their registration. | 80 characters | Client |
| r | Refcode - Identifies where the URL was placed. Usually used to identify an e-mail or a specific page on a site. May be used with Link Location and Banner Name to further pinpoint placement location and creative. Used for reporting purposes only. Optional. | 80 characters | Client |
| l | Link Location - Identifies where the URL was placed. May be used with RefCode and Banner Name for very specific tracking. Used for reporting purposes only. Optional. | 80 characters | Client |
| bn | Banner Name - Description of the creative. May be used with RefCode and URL Location. Used for reporting purposes only. Optional. | 80 characters | Client |
| Cf0 | See cf1; reserved for passing First Name | See cf1 | Client |
| Cf1 | Custom Field reserved for passing Last Name; may be used to pass information to SS that will be printed on the coupon. This information is not captured in the SS DB. Spaces and special characters are encoded. Note: When using Custom Fields, each field is used to pass the same information for all client URLs. For example, if using Cf0 for first name in one URL, should use it for name in any URL where it's included. | 20 characters | Client |
| Check | Used to pre-check an offer on the Dynamic Coupon Page. Usually used in conjunction with "fi." Optional. | 10 | Coupon system |
| Token | Used for Valid List Limiting. Checks the value against The Valid List. Optional. | 20 characters | Client |

The variables indicated by "aaa" are supplied by the coupon system in the print URL when the print URL is provided to a client, e.g., the partner. For example, a link value aaa is the :offerprintURLAction object 710, and the insertOfferprintURL( ) message is forwarded to an :offerprintURLManager object 720. The :offerprintURLManager object 720 in turn forwards to the insertOfferprintURL( ) message to an :offerprintURLDAO object 730. As described previously, DAO classes generally relate to specific business functionality and integrate the business tier with data tier. Hence, the :offerprintURLDAO object 730 sends a persistprintURL( ) message to the coupon system database 740 to retrieve the requisite offer data/information needed for the print URL/coupon to be created. Thereafter, the print URL is created, and the print URL created( ) message is sent back to the Create print URL UI object 700 to indicate that the print URL has been created.

Figure 8:
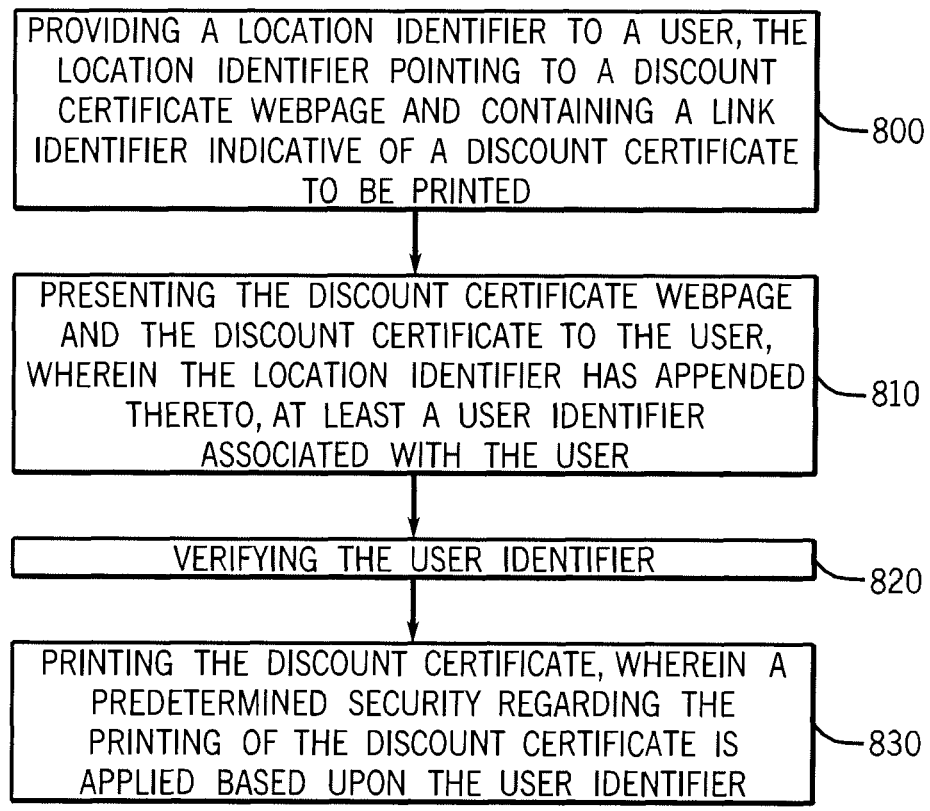
FIG. 8 is a flow chart illustrating exemplary processes performed for printing an electronic coupon via a print URL requiring MID functionality.

FIG. 8 is a flow chart illustrating exemplary processes performed from an operational perspective regarding the printing of an electronic coupon via a location identifier, e.g., print URL, requiring user identifier, e.g., MID, functionality in accordance with one embodiment. At 800, a location identifier (corresponding to an offer) is provided to a user (e.g., consumer), where the location identifier points to a discount certificate webpage and contains a link identifier (such as that indicated in Table 1) indicative of one or more discount certificates to be printed. It should be noted that the term "user" may refer to a single person, a group of persons, such as a family or company, or any other entity that may have a need or desire to obtain a discount certificate. For example, the MID may be indicative of a user, where the user is an actual person/group of persons, or alternatively a machine/computer or other identifiable apparatus, such as a "bot" that can be registered to receive coupons or discounts. Additionally, the MID may be utilized to track media in conjunction with or as an alternative to a unique user/entity, such as a banner advertisement and, e.g., a unique code, associated with the banner advertisement. Alternatively still, the MID may be implemented in such a manner that merely records, e.g., time and date of the accessing of a banner advertisement, for example.

The path (Internet address) identified in the location identifier points to a partner microsite, coupon system website, etc., where the discount certificates are presented. The location identifier may be provided to the user at, e.g., a partner site, or embedded within an email, implemented as a banner advertisement, etc. as described above. At 810 the discount certificate webpage (i.e., appropriate dynamic coupon page or microsite) is presented to the user as well as the discount certificate to be printed, wherein the location identifier has appended thereto, at least a user identifier associated with the user. The user identifier may, for example, be dynamically appended at the partner site when the location identifier/print URL is selected by the user. That is, the user is redirected/sent to the dynamic coupon page/microsite whose path is identified in the location identifier. At 820, the user identifier is validated/verified by the coupon system. At 830, printing of the discount certificate is performed, where a predetermined security regarding the printing of the coupon is applied based on at least the user identifier appended to the location identifier. For example, if only a set number of prints are allowed for a particular coupon, the coupon system may track or count the number of times a print request is received with the same user identifier, preventing printing of the particular coupon beyond the allowed number of times.

Optionally and in accordance with another embodiment, the coupon system may utilize token technology to prevent fraudulent or otherwise unauthorized printing of an electronic coupon. This token technology can be utilized in conjunction with the MID-based security described above. As with any conventional URL, a print URL or link could be posted in areas outside of the control of the coupon distributor. For example, the print URL could be posted on a blog or coupon website, where consumers post links or copies of electronic coupons for other consumer to take advantage of or redeem for themselves. Although preventing a print URL from being posted is not feasible, the token technology can prevent printing of the electronic coupon.

During setup, the print URL to be created is designated as a "token-type" print URL, where the print URL passed to the coupon system for printing must include a valid token or a print will not occur as indicated in Table 1. The token is an encrypted alphanumeric string or other appropriate code supplied to, e.g., a partner, or other website, web server, via a server-side process. In accordance with this embodiment, two URLs are provided to, e.g., a partner. A first URL is a consumer-facing print URL. A second URL is a "secret" or non-public URL that the partner or other website/web server may use to obtain the token from the coupon system. Each time a consumer attempts to print a coupon by, e.g., clicking on the first URL (displayed on a partner site, for example), a partner server or website at which the token-type print URL was accessed will contact a server of the coupon system and request a token via the second URL. That token is then passed back to the partner, website, etc. where the token is appended to the first URL. The partner or website/web server then passes the first URL (including the appended token) to the coupon system for validation and processing. It should be noted that consumers may still be subject to the consumer-level (MID) and device-level limits regarding, e.g., the allowed number of prints.

It should be noted that as alluded to above, various embodiments can be implemented in environments that only involve the coupon distributor (operating the coupon system) and a user. For example and as alluded to above, both the consumer-facing print URL and the secret URL may be embedded or otherwise associated with, e.g., an email, that may be sent to a user, or a banner advertisement hosted on a website/web server. Thus, the coupon distributor itself may operate/host more than one website, where an "initial" or "entrance" website may be presented to and accessed by a user via, e.g., the banner advertisement, and a "location" on or indicative of another website accessed for token generation as described in greater detail below.

Figure 9:
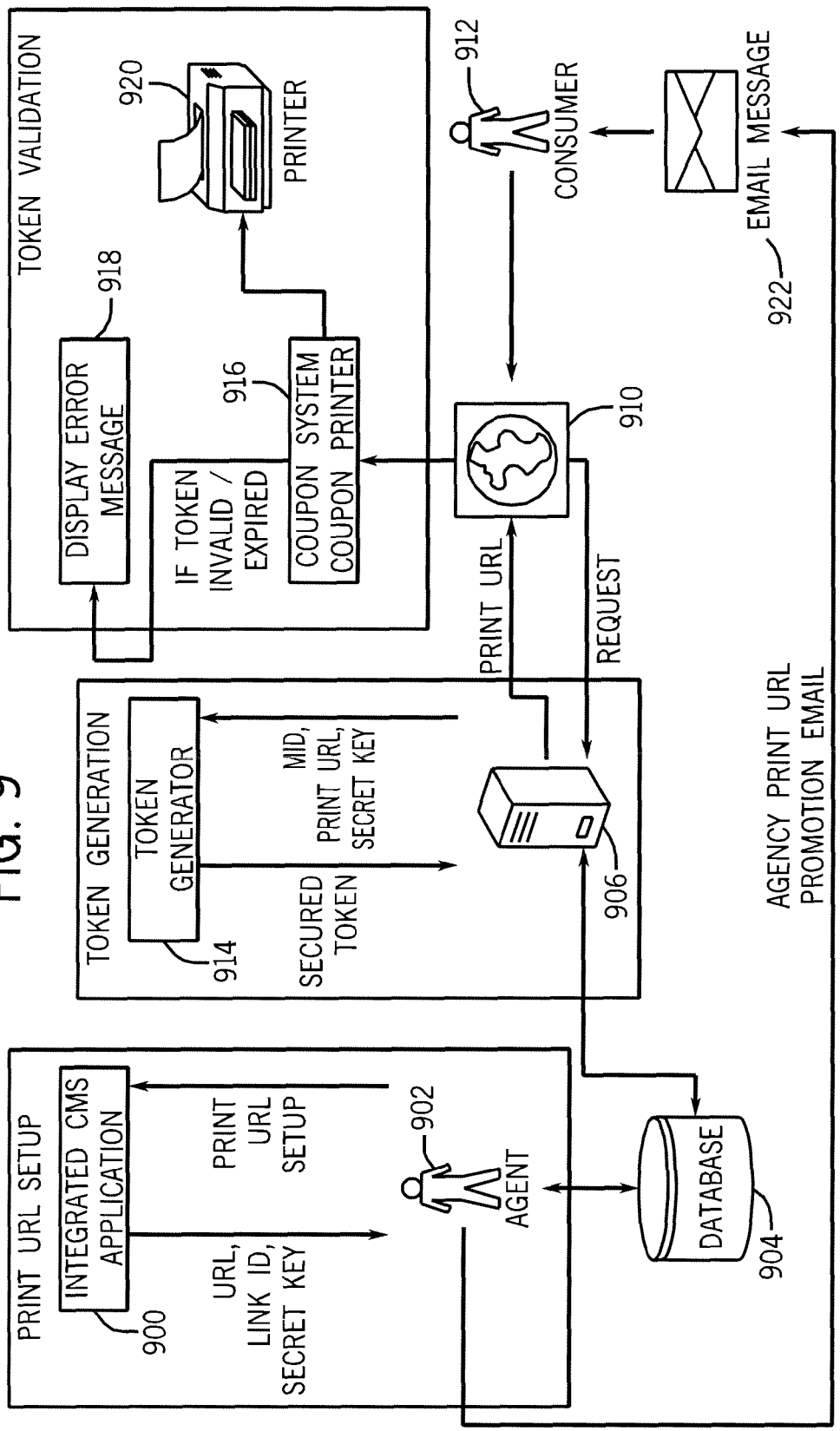
FIG. 9 illustrates an exemplary system implementation of printing utilizing a token-type print URL.

An example of a token-type print URL is as follows. http://coupons.smartsource.com/web/index.aspx?Link= aaa&MID=xxx&Token=xxx FIG. 9 illustrates an exemplary system implementation of printing utilizing a token-type print URL. The integrated CMS application 900 receives a print URL setup call from, e.g., an agent or agent server 902. A token-type print URL is created containing an appropriate print URL and link identifier (as described previously via the appropriate setup processes between the agent or agent server 902, database server 904, and the coupon system/website application 906), and a code or secret key. The token-type print URL may be displayed or posted on a partner site for accessing an appropriate coupon display page/microsite on the Internet 910. When a consumer 912 clicks on the token-type print URL, a print request is sent to the coupon system/website application 906 utilizing the second, secret URL for token generation. That is, the secret URL points to an appropriate "location" on the coupon system website to access a token generator 914. The coupon system/website application 906 forwards the secret print URL along with an appended MID and secret key to the token generator 914. It should be noted that the token generator may be a hardware or software module or a combination thereof. The token generator 914 returns a secured token back to the agent/agent server 902 which appends the token to the first, consumer-facing print URL. A banner advertisement or pop-button (or some other visual representation of the first, consumer-facing print URL (with the appended token, MID, link identifier, etc.) can be displayed for the consumer to click, whereupon the first, consumer-facing print URL (with the appended token, MID, link identifier, etc.) initiates the printing process at the coupon system "coupon printer" module 916. If the appended token is invalid, printing is prohibited and a notification such as an error message 918 is displayed to the consumer 912. If the token is valid, printing can be effectuated at a printer 920. Alternatively still, a banner advertisement or email 922 may be utilized to present a token-type print URL to the consumer 912, where the same or substantially the same processes can be performed as described above to effectuate printing.

Figure 10:
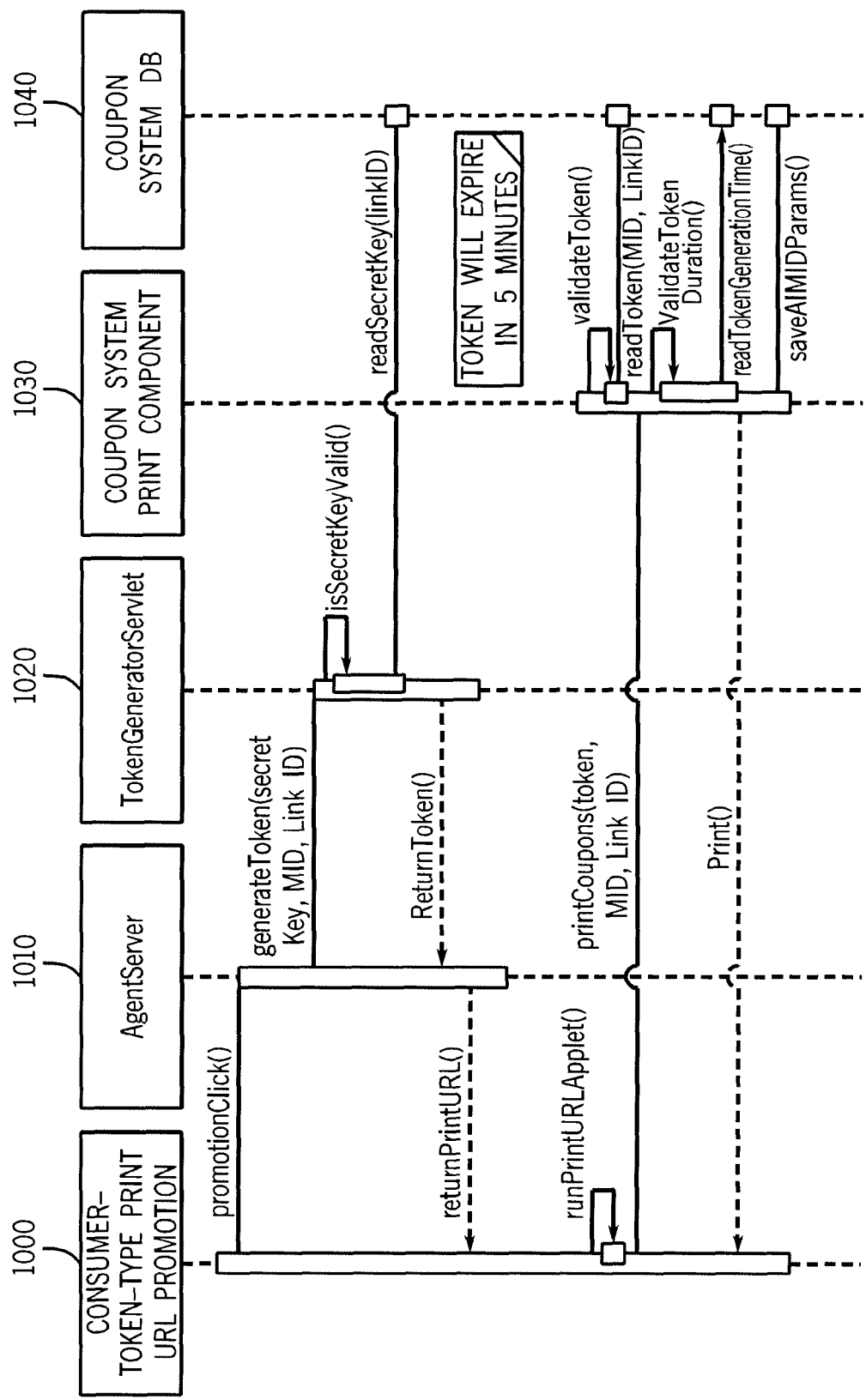
FIG. 10 is a sequence diagram illustrating various processes performed to effectuate printing based on a token-type print URL.

FIG. 10 is a sequence diagram illustrating various processes performed to create a token-type print URL and effectuate printing based on the token-type print URL. A consumer token-type print URL promotion 1000 may be accessed by a consumer and a promotionClick( ) message is sent to an AgentServer 1010. The AgentServer 1010 communicates with a TokenGenerationServlet 1020 to generate a token (based on the MID) and return the generated token to the AgentServer 1010. As indicated above, a code or secret key, in addition to a passed MID value, is utilized to generate the token. The secret key may be a random string of characters that is generated upon the creation/setup of a token-type print URL and appended to the secret URL along with the MID and any other partner or client-meaningful information. The TokenGeneratorServlet 1020 accepts the secret key, MID, and link identifier and determines whether the secret key is valid (is SecretKeyValid( )). Validating the secret key is accomplished by sending a readSecretKey (linked) to the coupon system database 1040 to determine whether the secret key generated by the coupon system is the same as that passed in the secret URL. It should be noted that the secret key can be any type of code or indicia, e.g., a 30 character key, that is specific to the token-type print URL. Moreover, because a secret key is specific to only a print URL, on that print URL will be jeopardized through its exposure (i.e., transmission via the secret URL).

The AgentServer 1010 then returns the consumer-facing token-type print URL by way of a returnPrintURL (with the token appended thereto) to the consumer, where, e.g., a runPrintURLApplet ( ), generates a banner advertisement or pop-up button for the consumer to click to initiate printing. A printCoupons (token, MID, Link ID) message is sent to the coupon system print component 1030 where the token is validated regarding the token itself and with regard to duration. That is, the coupon system print component 1030 determines, in conjunction with the coupon system database 1040, whether the correct token has been appended to the consumer-facing URL (validateToken( )) by sending a readToken (MID, Link ID) message to the coupon system database 1040. It should be noted that the MID is also validated to avoid fraudulent print attempts, where potentially a different MID is appended to the consumer-facing print URL with the same token. Additionally, token duration is validated by sending a readTokenGenerationTime ( ) message to the coupon system database 1040, where it is determined if the amount of time that has expired between token generation and token receipt exceeds a predetermined threshold. For example, a consumer may have, e.g., 5 minutes in which to initiate printing of a coupon. If the printCoupons (token, MID, Link ID) message is not received at the coupon system print component 1030 within the allotted period of time, the token is deemed to be expired and printing is prohibited. If the token has not yet expired, printing is allowed by sending a print message back to the consumer to allow the consumer to print the coupon at, e.g., a local printer. It should be noted that an intermediate level of security may be achieved, where token validation need not involve determining whether the token receipt has exceeded a predetermined threshold, but rather only whether the correct token has been appended to the consumer-facing URL.

A Sample .NET code for token generation is recited below.

```
private void Page_Load(object sender, System.EventArgs e)
{
    try
    {
        postData.Append("Link=");
        //Append Link provided by SmartSource.com
        postData.Append(Link.Text.Trim( ));
        postData.Append("&MID=");
        //Append MID value
        postData.Append(MID.Text.Trim( ));
        postData.Append("&key=");
        //Append Key provided by SmartSource.com
        postData.Append(Key.Text.Trim( ));
        vResponse =
readHtmlPage("http://coupons2.smartsource.com/smartsource/TokenGeneratorServlet?" +
postData.ToString( ), postData.ToString( ));
    }
    catch (Exception ex)
    {
    }
}
public string readHtmlPage(string url, string postData)
{
    ASCIIEncoding encoding = new ASCIIEncoding( );
    byte[ ] data = encoding.GetBytes(postData);
    // Prepare web request...
    HttpWebRequest myRequest = (HttpWebRequest)WebRequest.Create(url);
    myRequest.Method = "POST";
    myRequest.ContentType = "application/x-www-form-urlencoded";
    myRequest.ContentLength = data.Length;
    Stream newStream = myRequest.GetRequestStream( );
    // Send the data.
    newStream.Write(data, 0, data.Length);
    newStream.Close( );
```

-continued

```
    string result = null;
    WebResponse objResponse = myRequest.GetResponse( );
    StreamReader sr = new StreamReader(objResponse.GetResponseStream( ));
    result = sr.ReadToEnd( );
    sr.Close( );
    return result;
}
```

Figure 11:
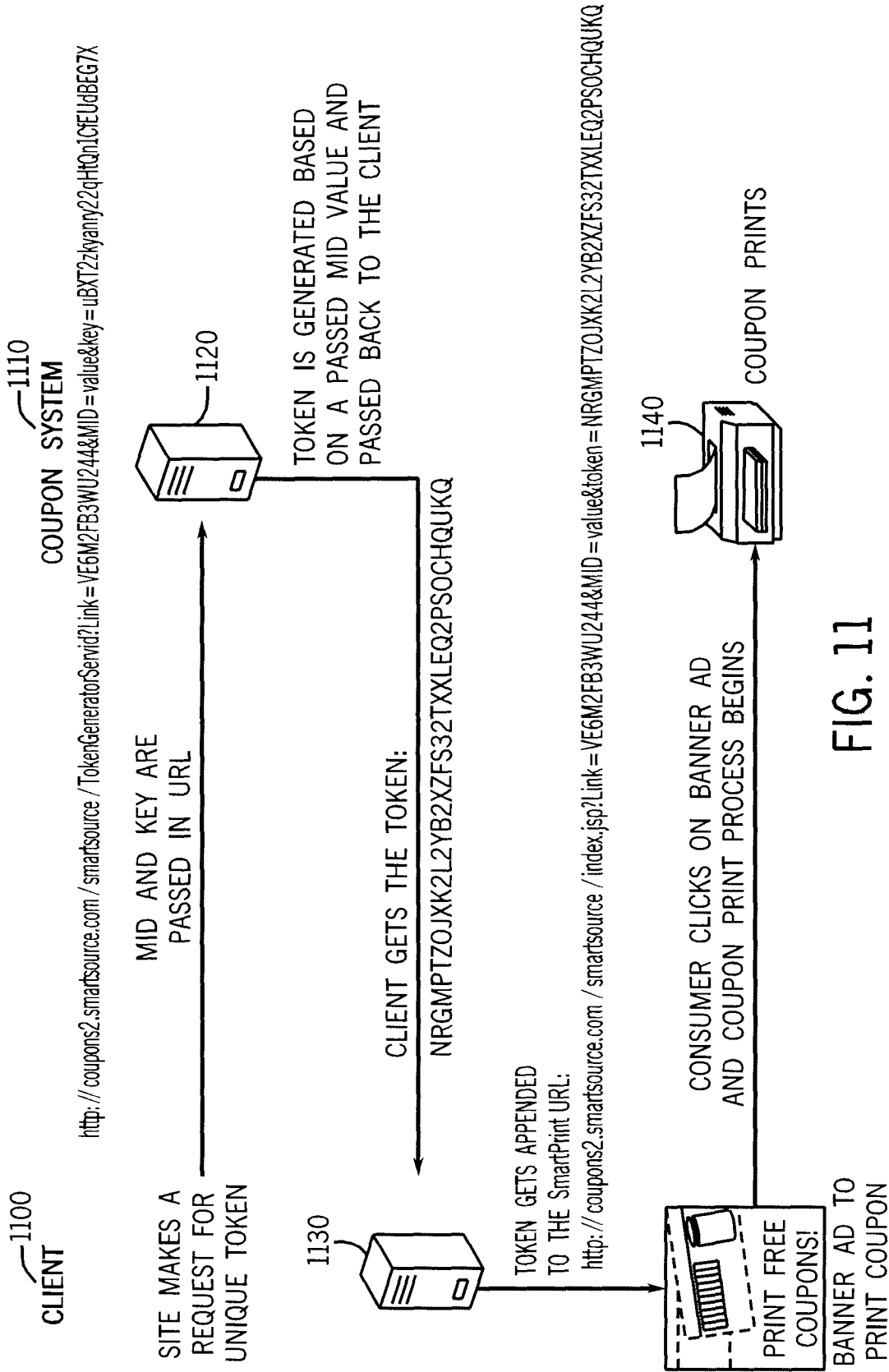
FIG. 11 illustrates an exemplary token-type print URL exchange.

FIG. 11 illustrates an exemplary exchange token-type URL exchange between a client (e.g., partner system/server) 1100 and the coupon system 1110. The client 1100 requests a unique token in response to, e.g., consumer clicking on a consumer-facing token-type print URL. The client 1100 utilizes a secret token-type print URL with at least a link identifier, secret key, and MID appended thereto to request the token from the coupon system token generator servlet 1120. The coupon system token generator servlet 1120 generates the token as described above and passes the token back to a client/agent server 1130, where the token gets appended to the consumer-facing token-type print URL. The consumer-facing token-type print URL with the appended token is displayed to the consumer as, e.g., a banner advertisement or pop-up button, and upon the consumer clicking the banner advertisement or pop-up button, the coupon print process begins, and if the MID and token are determined to be valid, printing can occur at a printer 1140.

Figure 12:
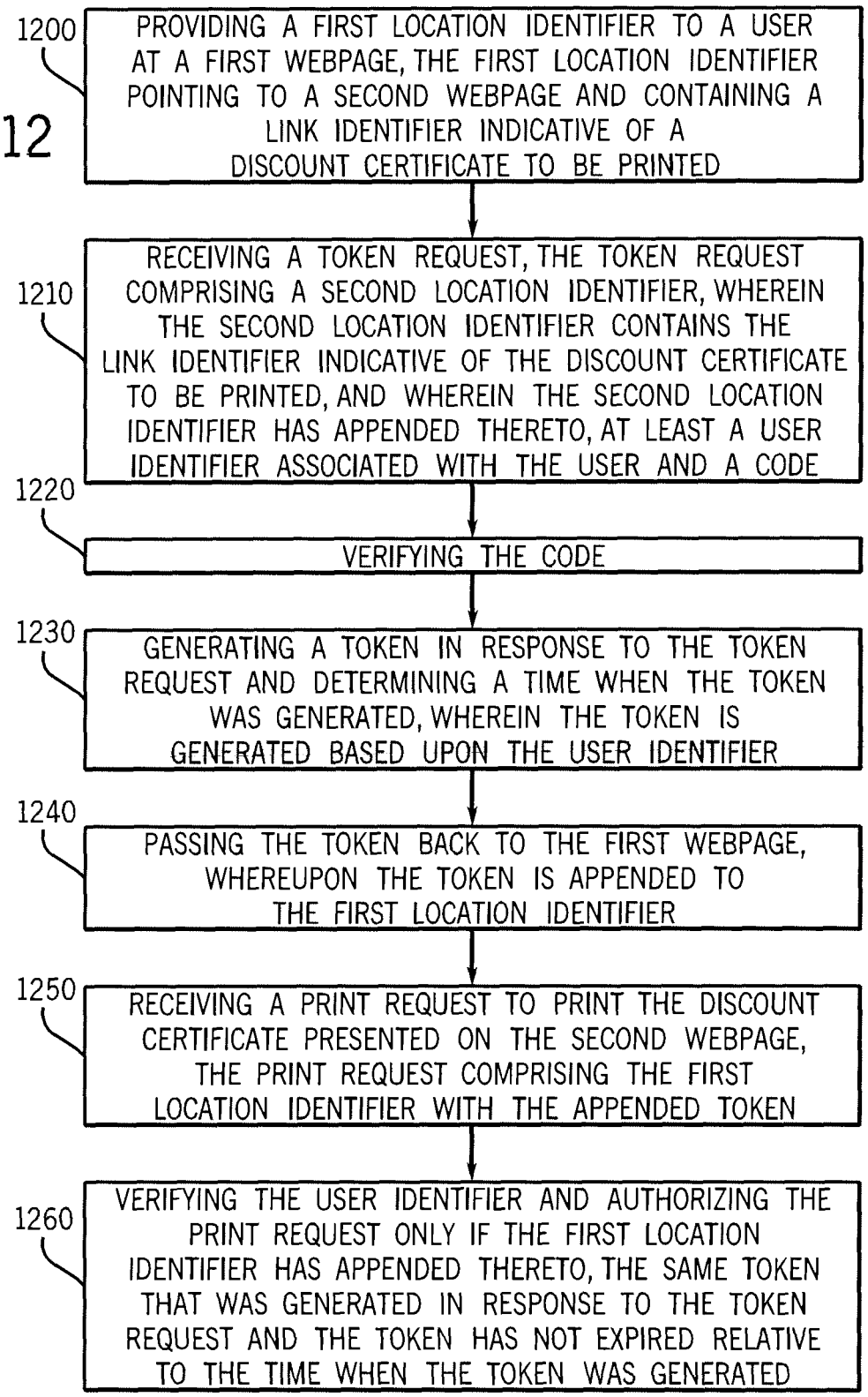
FIG. 12 is a flow chart illustrating exemplary processes performed for printing an electronic coupon via a token-type print URL in conjunction with MID functionality.

FIG. 12 is a flow chart illustrating exemplary processes performed from an operational perspective regarding the printing of an electronic coupon via a token-type print URL in accordance with one embodiment. At 1200, a first location identifier (e.g., URL) is provided to a user (e.g., consumer) at a first webpage, the first location identifier pointing to a second webpage and containing a link identifier indicative of a discount certificate to be printed. Again, it should be noted that the term "user"/"consumer" may refer to a single person, a group of persons, such as a family or company, or any other entity, e.g., apparatus or "bot" that may have a need or desire to obtain a discount certificate. At 1210, a token request is received, the token request comprising a second location identifier, wherein the second location identifier contains the link identifier indicative of the discount certificate to be printed, and wherein the second location identifier has appended thereto, at least a user identifier associated with the user and a code. At 1220, the code is verified. At 1230, a token is generated in response to the token request and the time at which the token was generated is determined, wherein the token is generated based upon the user identifier. At 1240, the token is passed back to the first webpage, whereupon the token is appended to the first location identifier. At 1250, a print request is received to print the discount certificate presented on the second webpage, the print request comprising the first location identifier with the appended token. At 1260, the user identifier is verified, and the print request is authorized only if the first location identifier has appended thereto, the same token that was generated in response to the token request, and the token has not expired relative to the time when the token was generated.

Various embodiments are described herein with reference to drawings. These drawings illustrate certain details of specific embodiments that implement the systems and methods and programs of the present invention. However, describing the invention with drawings should not be construed as imposing on the invention any limitations that may be present in the drawings. Various embodiments contemplate methods, systems and program products on any machine-readable media for accomplishing its operations. The embodiments of the present invention may be implemented using an existing computer processor, or by a special purpose computer processor incorporated for this or another purpose or by a hardwired system.

As noted above, various embodiments include computer program products embodied or encoded on, e.g., a non-transitory computer/machine-readable media (e.g., memory) for carrying or having machine-executable instructions or data structures stored thereon. Such computer/machine-readable media can be any available media which can be accessed by a general purpose or special purpose computer, server, or other machine with a processor or controller. By way of example, such computer/machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures. When information is transferred or provided over a network or another communications connection (either hardwired, wireless, or a combination of hardwired or wireless) to a machine, the machine properly views the connection as, e.g., a transitory computer/machine-readable medium. Combinations of the above are also included within the scope of computer/machine-readable media. Machine-executable instructions comprise, for example, instructions and data which cause a general purpose computer, special purpose computer, or special purpose processing machines to perform a certain function or group of functions.

Various embodiments are also described in the general context of method processes which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing processes of the methods disclosed herein. The particular sequence of such executable instructions or associated data structures represent examples of corresponding acts for implementing the functions described in such processes and it is understood that the order of these processes may differ from what is depicted. Also two or more processes may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching processes, correlation processes, comparison processes and decision processes. It should also be noted that the words "component" and "module" as used herein and/or in the claims is intended to encompass implementations using one or more lines of software code, and/or hardware implementations, and/or equipment for receiving manual inputs.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The foregoing description of embodiments of the invention has been presented for purposes of illustration and description. It is not intended to be exhaustive or to limit the invention to the precise form disclosed. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangements of the preferred and other exemplary embodiments without departing from the spirit of the present invention.

What is claimed is:

1. A method, comprising:
   providing for an entity that is not a user, using one or more computers, a first location identifier for use on a first public-facing webpage to the entity, and a non-public location identifier that points to a token generator configured in the one or more computers, the first location identifier pointing to a second webpage that includes a link identifier indicative of a discount certificate to be printed;
   receiving from a server of the entity that is not a user a token request at the token generator identified by the non-public location identifier, using the one or more computers, the token request comprising the non-public location identifier, the link identifier and a key for the discount certificate that is stored in one or more databases, and at least a user identifier associated with the user;
   verifying the key for the discount certificate, using the one or more computers; generating, if the key for the discount certificate is verified, using the one or more computers, a particular token in response to the token request and determining a generation time when the particular token was generated and storing or having stored that generation time in the one or more databases, wherein the token generator generates the particular token based at least in part upon the user identifier;
   passing the particular token back to the entity that is not a user, whereupon the particular token is appended to the first location identifier;
   receiving a print request to print the discount certificate, the print request comprising the first location identifier with the appended particular token;
   accessing, using the one or more computers, the generation time stored in the one or more databases and determining whether a threshold time has expired; and
   verifying, using the one or more computers, the user identifier; and
   authorizing the print request only if the first location identifier has appended thereto, the particular token that was generated in response to the token request, and the threshold time for the token has not expired relative to the time when the token was generated.

2. The method of claim 1, wherein the first location identifier is a public, consumer-facing Uniform Resource Locator.

3. The method of claim 1, wherein the non-public location identifier is a non-public Uniform Resource Locator.

4. The method of claim 1, wherein the non-public location identifier points to a token generator of a discount certificate distributor system operating the second webpage.

5. The method of claim 1, wherein the first webpage is operated by one of a discount certificate distributor and a partner of a discount certificate distributor, and wherein the second webpage is operated by the discount certificate distributor.

6. The method of claim 5, wherein the second webpage comprises a microsite personalized for the partner of the discount certificate distributor.

7. The method of claim 1, wherein the user identifier is a randomly generated fixed-length string of characters uniquely identifying the user assigned during user registration, and with at least one of a discount certificate distributor operating the first webpage and a discount certificate distributor partner system operating the first webpage.

8. The method of claim 1, wherein the first location identifier has additional information appended thereto, the additional information being customizable and meaningful to a discount certificate distributor partner system operating the first webpage.

9. The method of claim 1 further comprising, providing a parameter recovery identifier to allow joining of user identifier data with redemption data to determine whether the user purchased at least one of a product and service associated with the discount certificate that was printed.

10. The method of claim 1, wherein the discount certificate comprises an electronic coupon.

11. The method of claim 1, wherein the authorizing the printing step further comprises not authorizing the printing of the discount certificate unless a number of times the discount certificate has been printed is less than an allowed number.

12. The method of claim 1, wherein the authorizing the printing step further comprises not authorizing the printing of the discount certificate unless the printing of the discount certificate is to occur at an actual printing device.

13. A system, comprising:
   one or more databases, stored on a computer-readable storage device, comprising:
   (a) respective keys for respective coupon discounts; and
   (b) respective token generation times;
   a server comprising one or more computers operatively connected to the one or more databases; and
   a computer-readable memory operatively connected to the server and including:

computer executable code configured to provide for an entity that is not a user, a first location identifier for use on a first public-facing webpage to the entity, and a non-public location identifier that points to a token generator configured in the one or more computers, the first location identifier pointing to a second webpage that includes a link identifier indicative of a discount certificate to be printed;

computer executable code configured to receive from a server of the entity that is not a user a token request at the token generator identified by the non-public location identifier, the token request comprising the non-public location identifier, the link identifier and a key for the discount certificate that is stored in the one or more databases, and at least a user identifier associated with the user;

computer executable code configured to verify the key for the discount certificate;

computer executable code configured to generate, if the key for the discount certificate is verified, a particular token in response to the token request and determine a generation time when the particular token was generated and to store or have stored that generation time in the one or more databases, wherein the token generator generates the particular token based at least in part upon the user identifier;

computer executable code configured to pass the particular token back to the entity that is not a user, whereupon the particular token is appended to the first location identifier;

computer executable code configured to receive a print request to print the discount certificate, the print request comprising the first location identifier with the appended particular token;

computer executable code configured to access, using the one or more computers, the generation time stored in the one or more databases and to determine whether a threshold time has expired; and computer executable code configured to verify, using the one or more computers, the user identifier and authorize the print request only if the first location identifier has appended thereto, the particular same-token that was generated in response to the token request, and the threshold time for the token has not expired relative to the time when the token was generated.

14. The system of claim 13, wherein the first location identifier is a public, consumer-facing Uniform Resource Locator.

15. The system of claim 13, wherein the non-public location identifier is a non-public Uniform Resource Locator.

16. The system of claim 13, wherein the non-public location identifier points to a token generator of a discount certificate distributor system operating the second webpage.

17. The system of claim 13, wherein the first webpage is operated by one of a discount certificate distributor and a partner of a discount certificate distributor, and wherein the second webpage-hosted on the server is operated by the discount certificate distributor.

18. The system of claim 17, wherein the second webpage-comprises a microsite personalized for the partner of the discount certificate distributor.

19. The system of claim 13, wherein the user identifier is a randomly generated fixed-length string of characters uniquely identifying the user assigned during user registration with at least one of a discount certificate distributor operating the first webpage and a discount certificate distributor partner system operating the first webpage.

20. The system of claim 13, wherein the first location identifier has additional information appended thereto, the additional information being customizable and meaningful to a discount certificate distributor partner system operating the first webpage.

21. The system of claim 13 further comprising, providing a parameter recovery identifier to allow joining of user identifier data with redemption data to determine whether the user purchased at least one of a product and service associated with the discount certificate that was printed.

22. The system of claim 13, wherein the discount certificate comprises an electronic coupon.

23. The system of claim 13, further comprising computer code configured to prevent authorizing the printing of the discount certificate unless a number of times the discount certificate has been printed is less than an allowed number.

24. The system of claim 13, further comprising computer code configured to prevent authorizing the printing of the discount certificate unless and the printing of the discount certificate is to occur at an actual printing device.

* * * * *